United States Patent
Aoki et al.

(10) Patent No.: US 8,355,564 B2
(45) Date of Patent: Jan. 15, 2013

(54) CORRESPONDING POINT SEARCHING METHOD AND THREE-DIMENSIONAL POSITION MEASURING METHOD

(75) Inventors: Takafumi Aoki, Miyagi (JP); Takuma Shibahara, Miyagi (JP); Hiroshi Nakajima, Tokyo (JP); Koji Kobayashi, Tokyo (JP); Atsushi Katsumata, Tokyo (JP)

(73) Assignees: Azbil Corporation, Tokyo (JP); National University Corporation Tohoku University, Tokyo (JP)

( * ) Notice: Subject to any disclaimer, the term of this patent is extended or adjusted under 35 U.S.C. 154(b) by 766 days.

(21) Appl. No.: 12/513,846

(22) PCT Filed: Nov. 9, 2007

(86) PCT No.: PCT/JP2007/071783
§ 371 (c)(1),
(2), (4) Date: May 6, 2009

(87) PCT Pub. No.: WO2008/056765
PCT Pub. Date: May 15, 2008

(65) Prior Publication Data
US 2009/0304266 A1 Dec. 10, 2009

(30) Foreign Application Priority Data
Nov. 9, 2006 (JP) ................................ 2006-304620

(51) Int. Cl.
*G06K 9/00* (2006.01)
(52) U.S. Cl. ...................................... 382/154; 382/207
(58) Field of Classification Search .......................... None
See application file for complete search history.

(56) References Cited

U.S. PATENT DOCUMENTS
2005/0088515 A1* 4/2005 Geng ............................... 348/47
(Continued)

FOREIGN PATENT DOCUMENTS
JP 05-016811 A 1/1993
(Continued)

OTHER PUBLICATIONS
Shibahara, T.; Aoki, T.; Nakajima, H.; Kobayashi, K.; , "A Sub-Pixel Stereo Correspondence Technique Based on 1D Phase-only Correlation," Image Processing, 2007. ICIP 2007. IEEE International Conference on , vol. 5, no., pp. V-221-V-224, Sep. 16, 2007-Oct. 19, 2007.*

(Continued)

*Primary Examiner* — Atiba O Fitzpatrick
*Assistant Examiner* — Thomas A James
(74) *Attorney, Agent, or Firm* — Blakely, Sokoloff, Taylor & Zafman

(57) ABSTRACT

A plurality of images (I, J) of an object (M) when viewed from different viewpoints are taken in. One of the images is set as a standard image (I), and the other image is set as a reference image (J). One-dimensional pixel data strings with a predetermined width (W) are cut out from the standard image (I) and the reference image (J) along epipolar lines (EP1, EP2) calculated from a camera parameter (CPR) and the reference point (p). Calculating a phase-only correlation function from the cut one-dimensional pixel data strings will obtain a correlation peak position (Pa1). A positional shift amount (d) from the correlation peak position (Pa1) is obtained. A search is made for a corresponding point (q) corresponding to the reference point (p) based on this position shift amount (d).

5 Claims, 17 Drawing Sheets

U.S. PATENT DOCUMENTS

2008/0273751 A1* 11/2008 Yuan et al. .................. 382/103

FOREIGN PATENT DOCUMENTS

| JP | 07-280560 | 10/1995 |
| --- | --- | --- |
| JP | 07-294215 | 11/1995 |
| JP | 10-132534 A | 5/1998 |
| JP | 2001-155154 A | 6/2001 |
| JP | 2004-234423 | 8/2004 |

OTHER PUBLICATIONS

Jyo, "Three-Dimensional CG Created from Photo", Kindai Kagaku Sha, Feb. 25, 2003, Second impression of first edition, pp. 31-33.

Digital image processing editorial board, "Digital Image Processing", CG-ARTS Society, 2005.

Scharstein et al., "A Taxonomy and Evaluation of Dense Two-Frame Stereo Correspondence Algorithms", IJCV 47 (1/2/3): 7-42, Apr.-Jun. 2002.

Ma et al., "An Invitation to 3-D Vision: From Images to Geometric Models (Interdisciplinary Applied Mathematics)" Springer, 2004.

Takita et al., "High-accuracy subpixel image registration based on phase-only correlation", IEICE Trans. Fundamentals, vol. E86-A, No. 8, pp. 1925-1934, Aug. 2003.

Takita et al., "A sub-pixel correspondence search technique for computer vision applications", IEICE Trans. Fundamentals, vol. E87-A, No. 8, pp. 1913-1923, Aug. 2004.

Muquit et al., "A high-accuracy passive 3D measurement system using phase-based image matching", IEICE Trans. Fundamentals, vol. E89-A, No. 3, pp. 686-697, Mar. 2006.

Jyo et al., "3-D Vision", Kyoritsu Publishing, 1998.

* cited by examiner

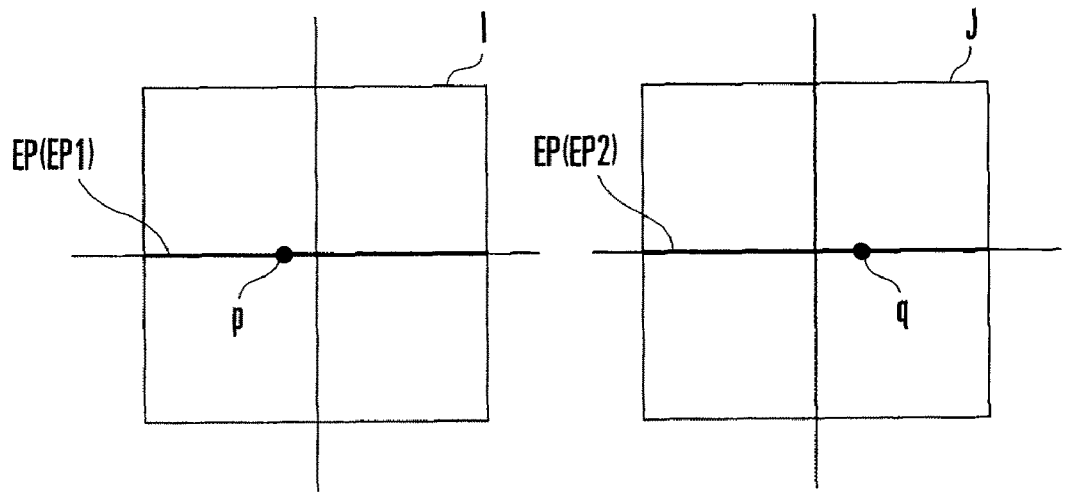
F I G. 2
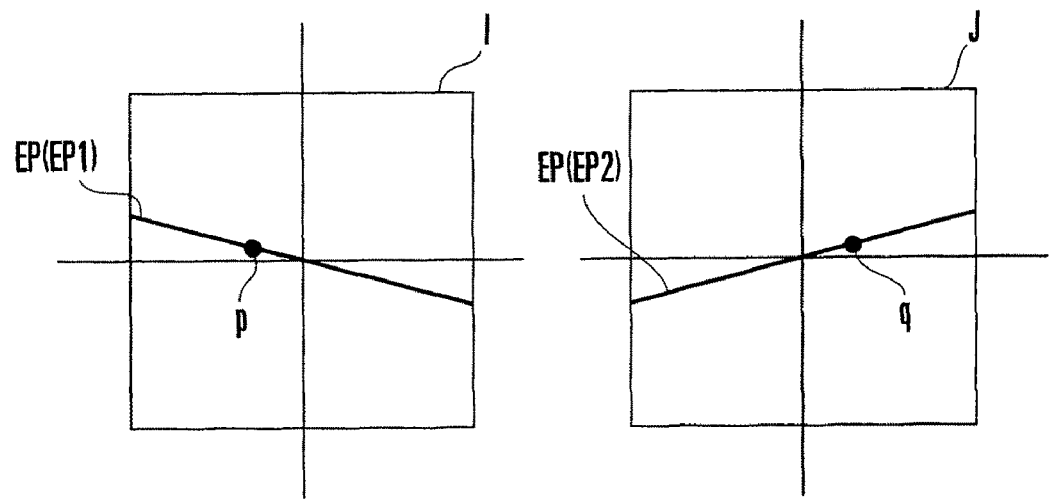
F I G. 3

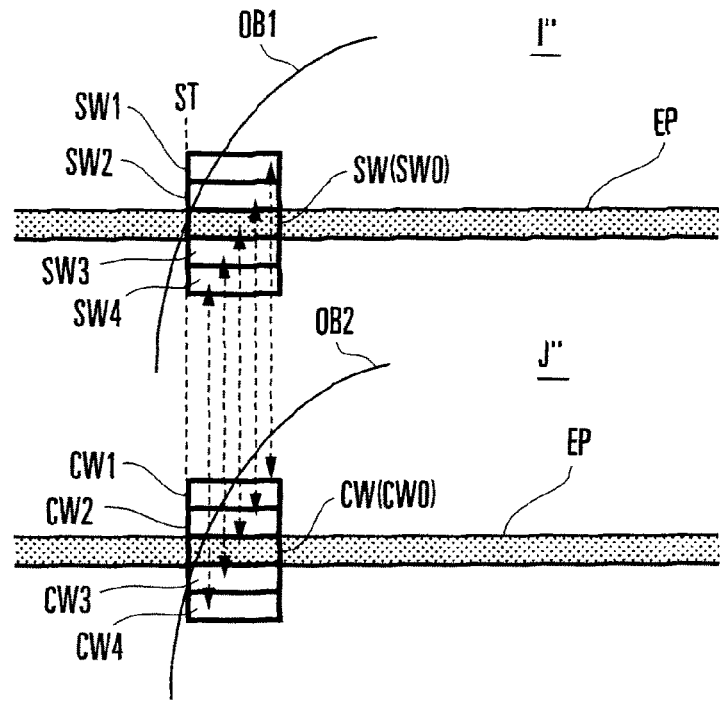
F I G. 9
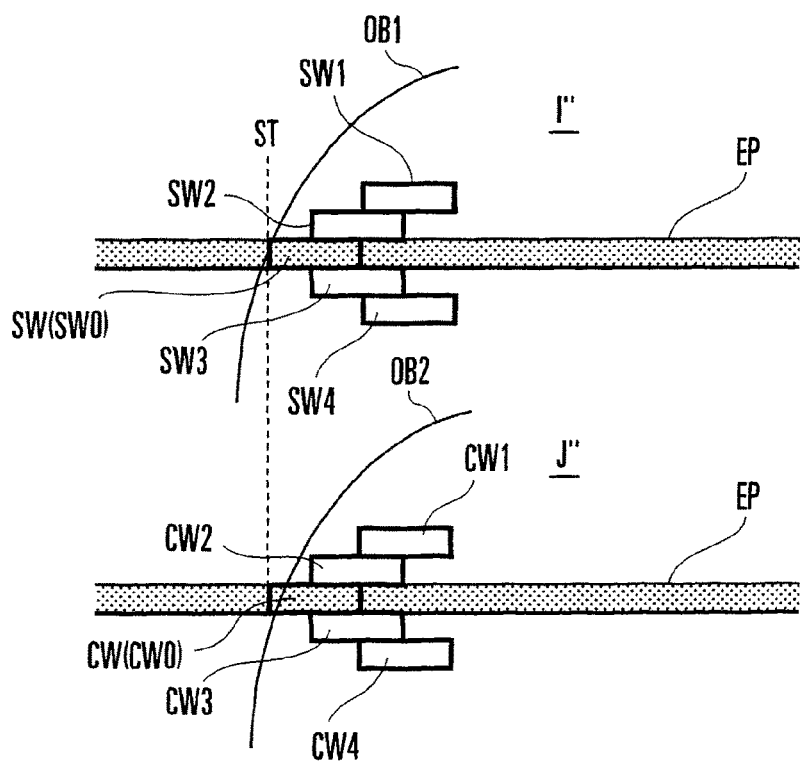
F I G. 10

Image size : 1000 x 1000 pixels
Camera : Adimec-1000m/D
　　　　10 bits digital resolution
　　　　monochrome
Lens : μTRON, FV1520
　　　　15 mm focal length
Image grabber : Coreco Imaging
　　　　X64-CL-DUAL-32M
Measurement range : 400 ~ 600 mm
Lighting : ambient light

CORRESPONDING POINT SEARCHING METHOD AND THREE-DIMENSIONAL POSITION MEASURING METHOD

The present patent application is a Utility claiming the benefit of Application No. PCT/JP2007/071783, filed Nov. 9, 2007.

TECHNICAL FIELD

The present invention relates to a corresponding point searching method of searching for corresponding points in a plurality of images of a stereoscopic object, e.g., a human face, as an object when viewed from different viewpoints, and a three-dimensional position measuring method using the corresponding point searching method.

BACKGROUND ART

Conventionally, searching for corresponding points in a plurality of images of an object when viewed from different viewpoints has been regarded as an important technique in various fields such as image sensing, image/video signal processing, and computer vision. In these fields, a pixel-accuracy matching technique is often used. Recently, however, there have been increasing demands for a subpixel-accuracy matching technique.

For example, a subpixel-accuracy matching algorithm is indispensable to achieve a sufficient three-dimensional measurement accuracy in a stereo vision system with a short baseline length. In addition, a subpixel-accuracy matching algorithm is also important for a video resolution enhancement technique based on a super-resolution technique. For this reason, for example, the stereoscopic image measuring apparatus disclosed in reference 1 (Japanese Patent Laid-Open No. 10-132534) meets the requirement for subpixel-accuracy matching by searching for corresponding points in a plurality of images of an object when viewed from different viewpoints using a two-dimensional phase-only correlation method.

FIG. 20 is a schematic view of an image input unit in the stereoscopic image measuring apparatus disclosed in reference 1 described above. Referring to FIG. 20, reference numeral 1 denotes a first camera; and 2, a second camera. Reference symbol M denotes an object (human face). The cameras 1 and 2 are arranged side by side in the horizontal direction with the distance between lenses LN1 and LN2 being represented by L. For easy understanding, FIG. 20 shows the cameras 1 and 2 viewed from above and the object M viewed from the side.

This stereoscopic image measuring apparatus captures an image of the object M as an input image I by the camera 1 and divides the image data of the input image I into m×n local regions I(i, j). The apparatus then cuts out the local region I(i, j) from the image data of the input image I, and obtains Fourier image data (input Fourier image data) by performing two-dimensional discrete Fourier transform (DFT) for the image data of the cut local region I(i, j).

The apparatus also captures an image of the object M as a reference image J by the camera 2 and obtains Fourier image data (reference Fourier image data) by performing two-dimensional discrete Fourier transform for the image data of the reference image J.

The apparatus then combines the obtained input Fourier image data and the reference Fourier image data, normalizes the amplitude component of the combined Fourier image data (composite Fourier image data), and performs two-dimensional discrete Fourier transform (or two-dimensional discrete inverse Fourier transform) again.

The apparatus obtains the intensity (amplitude) of the correlation component of each pixel in a predetermined correlation component area from the composite Fourier image data having undergone this two-dimensional discrete Fourier transform, and sets, as a position Pa1 of a correlation peak, the position of a pixel having the highest intensity in the correlation component area.

In this case, a distance A from a center P0 of the correlation component area to the position Pa1 of the correlation peak indicates the shift amount between the local region I(i, j) in the image data of the input image I and a given region (corresponding region) in corresponding image data in the image data of the reference image J. The position of an image in the local region I(i, j) in the input image I shifts from an image in the corresponding region in the reference image J due to parallax. This shift appears as a shift amount A.

Based on this shift amount A, the apparatus matches the center point (reference point) of the local region I(i, j) in the input image with the center point (corresponding point) of the corresponding region in the reference image J, and calculates a distance R from each camera to the corresponding point (reference point) of the object M according to equation (1) based on the triangulation principle. Note that in equation (1), f is the distance from the center of a lens LN (LN1, LN2) to the image capturing position, and L is the inter-lens distance.

$$R = f \cdot L / A \quad (1)$$

DISCLOSURE OF INVENTION

Problem to be Solved by the Invention

The technique disclosed in reference 1 described above has the merits of being very high in matching accuracy and allowing the same algorithm to be applied to various images. However, this technique requires a large calculation amount for two-dimensional discrete Fourier transform, and hence is difficult to apply to a field requiring to obtain a matching result in a short period of time.

The present invention has been made to solve the above problem, and has as its object to provide a corresponding point searching method and three-dimensional position measuring method which can obtain a matching result in a short period of time with high accuracy while greatly reducing the calculation amount required for a search for corresponding points.

Means of Solution to the Problem

In order to achieve the above object, a corresponding point searching method according to the present invention includes the steps of taking in a plurality of images of an object when viewed from different viewpoints via image take-in means, cutting out one-dimensional pixel data strings from the plurality of images along epipolar lines calculated from a parameter for the image take-in means and a reference point, and searching for corresponding points in the plurality of images from a correlation between the one-dimensional pixel data strings cut out from the plurality of images.

In the present invention, if, for example, the image take-in means includes two cameras arranged at a predetermined distance and the first and second cameras are arranged at equidistant positions from an object without being tilted, both epipolar lines on the images captured by the first and second cameras are horizontal. In contrast, if either of the first and second cameras is tilted, epipolar lines on the images captured by the first and second cameras are also tilted. As described above, epipolar lines on the images captured by the first and second cameras are determined by the positional relationship (parameters unique to the cameras, e.g., a basic matrix between two images and internal and external matrices) between the first and second cameras. In the present invention, such parameters for the image take-in means are stored in advance and are used in a processing sequence for searching for corresponding points.

In the present invention, the image take-in means is not limited to a plurality of cameras. For example, it suffices to provide an optical mechanism to obtain a plurality of images of an object when viewed through one camera from different viewpoints.

In the present invention, when one of a plurality of images is set as an input image, and the other image is set as a reference image, one-dimensional pixel data strings (e.g., 32-pixel data strings) are cut out from the input image and the reference image along the epipolar lines calculated from parameters for the image take-in means and a reference point. A corresponding point in the reference image which corresponds to the reference point in the input image is searched out based on the correlation between the one-dimensional pixel data strings cut out along the epipolar lines, and the reference point and the corresponding point are matched.

In this case, the pixel data string at the reference point is a one-dimensional pixel data string, and a pixel data string in the reference image is also a one-dimensional pixel data string. Therefore, the one-dimensional phase-only correlation method (one-dimensional POC) can be used. That is, a positional shift amount is obtained from the correlation peak position obtained by calculating a phase-only correlation from the one-dimensional pixel data strings cut out from a plurality of images. This positional shift amount allows to search for corresponding points in a plurality of images.

One-dimensional POC can greatly reduce a calculation amount because it can perform one-dimensional Fourier transform. This makes it possible to greatly reduce the calculation amount required for a search for a corresponding point and obtain a matching result in a short period of time. Using one-dimensional POC can reduce correlation error factors in a direction perpendicular to an epipolar line and implement an accurate corresponding point search.

EFFECTS OF THE INVENTION

According to the present invention, a plurality of images of an object when viewed from different viewpoints are taken in via the image take-in means, one-dimensional pixel data strings are cut out from the plurality of images along epipolar lines calculated from a parameter for the image take-in means and a reference point, and a search is made for corresponding points in the plurality of images based on the correlation between the one-dimensional pixel data strings cut out from the plurality of images. Therefore, one-dimensional POC can be used, and a matching result can be obtained in a short period of time by greatly reducing the calculation amount required for a search for a corresponding point. In addition, using one-dimensional POC can reduce correlation error factors in a direction perpendicular to an epipolar line, and an accurate corresponding point search can be performed.

BRIEF DESCRIPTION OF DRAWINGS

FIG. 2 is a view for explaining epipolar lines existing as horizontal lines on two images of an object when viewed from different viewpoints;

FIG. 3 is a view for explaining epipolar lines existing as inclined lines on two images of the object when viewed from different viewpoints;

FIG. 9 is a view for explaining an example of how to search for corresponding points by determining a plurality of pairs of neighboring search windows parallel to search windows;

FIG. 10 is a view for explaining a modification of the example of how to search for corresponding points by determining a plurality of pairs of neighboring search windows parallel to search windows;

BEST MODE FOR CARRYING OUT THE INVENTION

Figure 1:
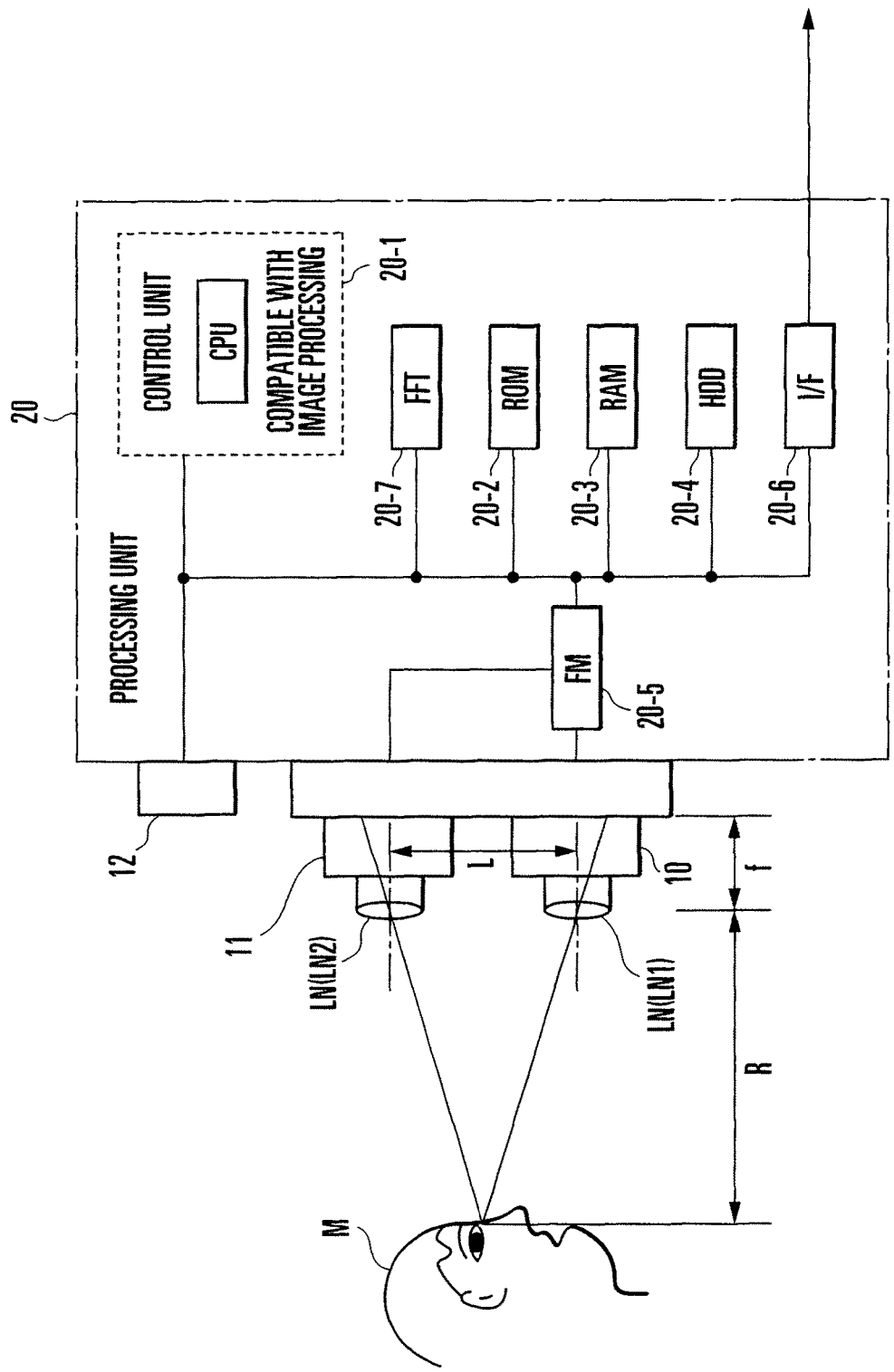
FIG. 1 is a block diagram showing the arrangement of an embodiment of a three-dimensional position measuring apparatus using a corresponding point searching method according to the present invention.

The present invention will be described in detail below with reference to the accompanying drawings. FIG. 1 is a block diagram showing the arrangement of an embodiment of a three-dimensional position measuring apparatus using a corresponding point searching method according to the present invention. Referring to FIG. 1, reference numeral 10 denotes a first camera (CCD camera); 11, a second camera (CCD camera); 12, a liquid crystal display apparatus (LCD); and 20, a processing unit. The processing unit 20 includes a control unit 20-1 having a CPU, a ROM 20-2, a RAM 20-3, a hard disk drive (HDD) 20-4, a frame memory (FM) 20-5, an external connection unit (I/F) 20-6, and a Fourier transform unit (FFT) 20-7. A three-dimensional position measuring program is stored in the ROM 20-2.

Figure 20:
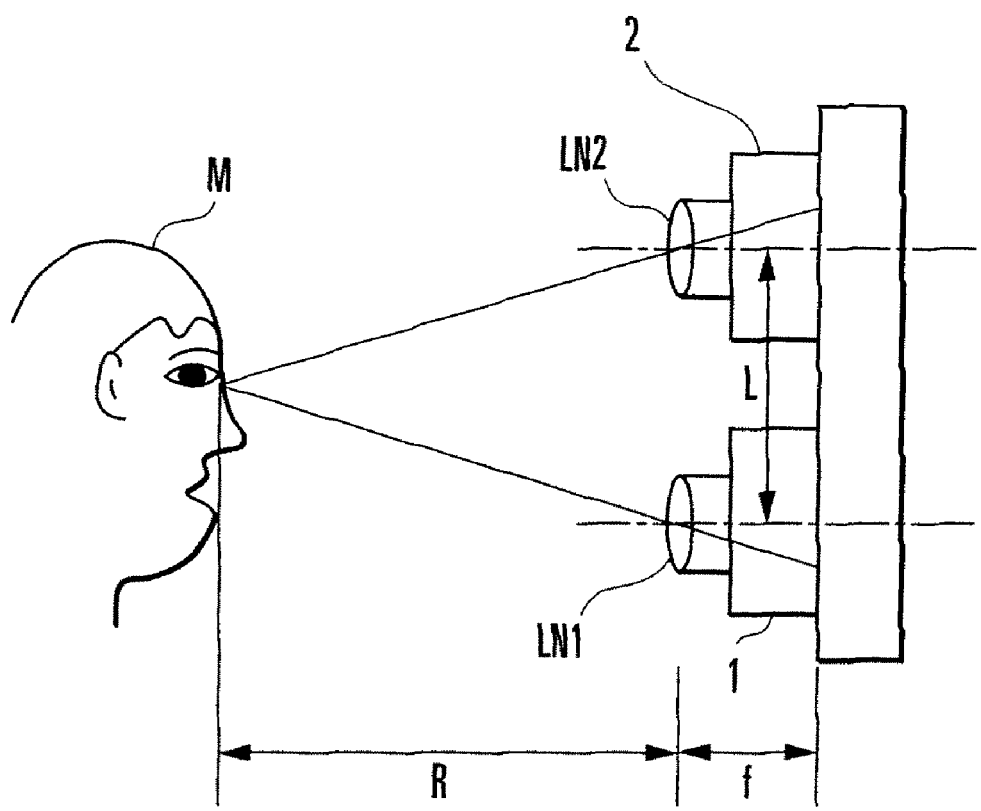
FIG. 20 is a view showing an outline of an image input unit in the stereoscopic image measuring apparatus disclosed in reference 1.
Figure 21:
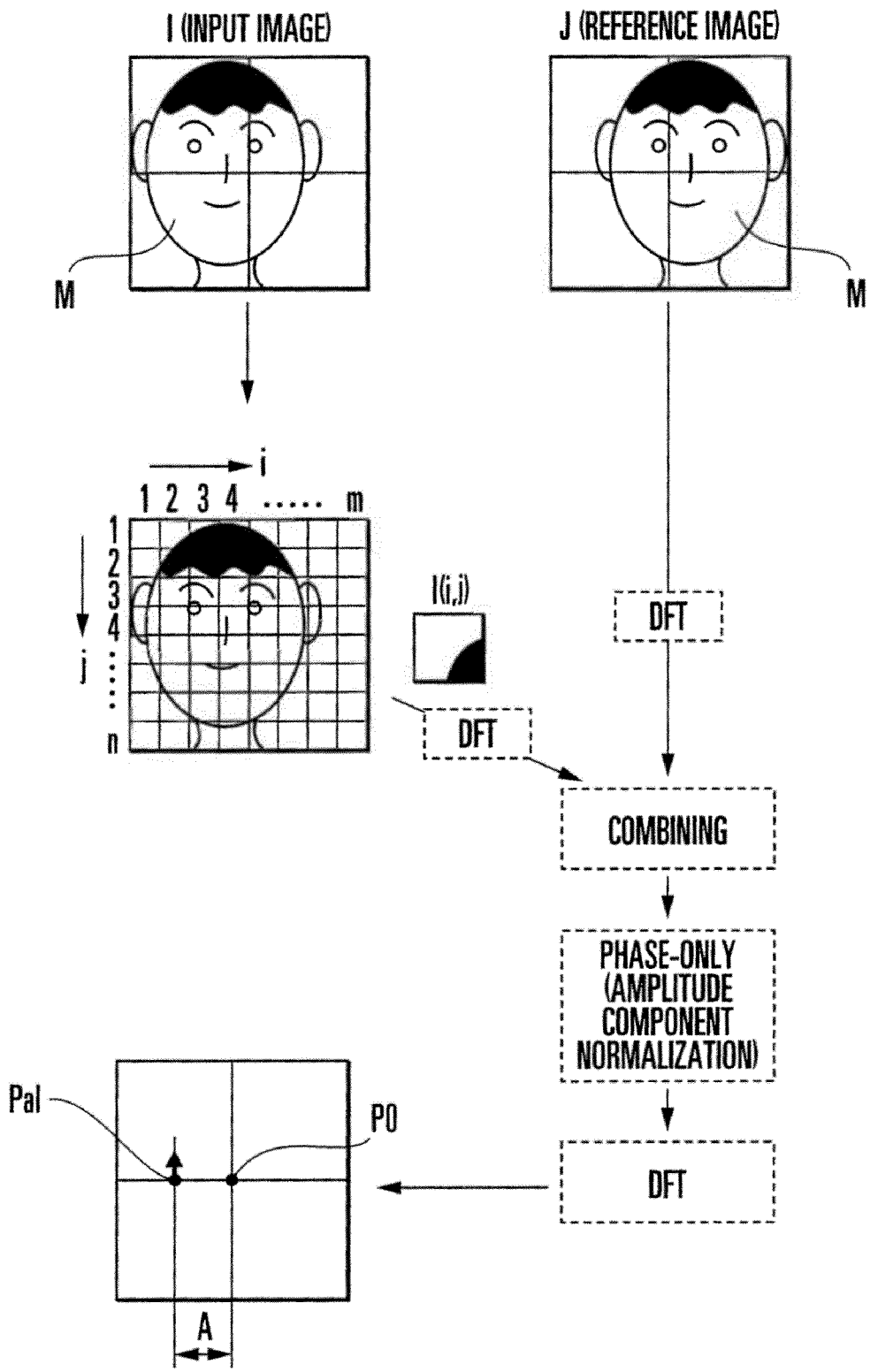
FIG. 21 is a view for explaining stereoscopic image measurement processing using a two-dimensional phase-only correlation method in the stereoscopic image measuring apparatus disclosed in reference 1.

The cameras 10 and 11 are arranged at a predetermined distance L as in the prior art shown in FIG. 20. That is, the cameras 10 and 11 are arranged side by side in the horizontal direction with the distance between lenses LN1 and LN2 being represented by L. For easy understanding, FIG. 1 also shows the three-dimensional position measuring apparatus viewed from above and an object M viewed from the side.

[Storage of Camera Parameters]

The cameras 10 and 11 are arranged at the predetermined distance L. If the cameras 10 and 11 are arranged such that their optical axes are parallel to each other and the horizontal axes of image coordinates are set in the same direction on the same straight line, both a straight line EP1 on which a reference point p exists on an image I captured by the camera 10 and a straight line EP2 on which a corresponding point q exists on an image J captured by the camera 11, i.e., the epipolar lines EP1 and EP2, become horizontal, as shown in FIG. 2. Note that epipolar lines are explained in reference 2 (JYO Go, "Three-Dimensional CG Created from Photo", Kindai Kagaku Sha, Feb. 25, 2003, second impression of first edition, pp. 31-33) and the like, and hence a detailed description will be omitted.

In contrast, if one of the cameras 10 and 11 is inclined, the epipolar lines EP1 and EP2 on the images I and J respectively captured by the cameras 10 and 11 are also inclined. In this manner, epipolar lines EP (EP1, EP2) on the images I and J respectively captured by the cameras 10 and 11 are determined by the positional relationship (parameters unique to the cameras, e.g., a basic matrix between two images and internal and external matrices) between the cameras 10 and 11. This embodiment stores in advance, in a hard disk, parameters (camera parameters CPR) representing the positional relationship between the cameras 10 and 11, and uses them in a processing sequence in a corresponding point search to be described later.

[Measurement of Three-Dimensional Positions]

When the object M is a human face, this three-dimensional position measuring apparatus measures the three-dimensional position of each point on the object M in the following manner. The control unit 20-1 performs this three-dimensional position measurement processing in accordance with the three-dimensional position measuring program stored in the ROM 20-2.

[Taking-in of Images]

Figure 4:
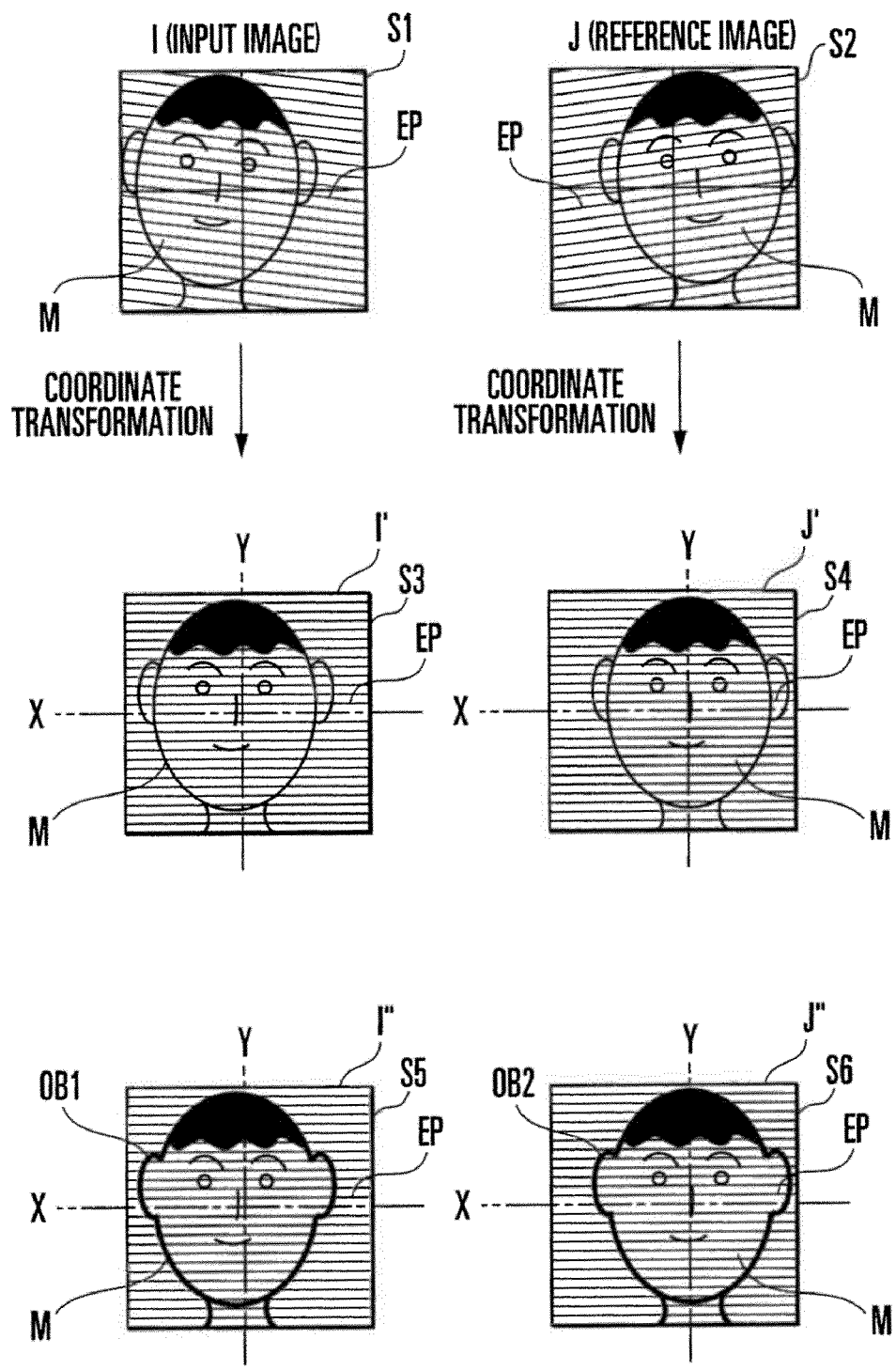
FIG. 4 is a view for explaining a processing sequence from the taking-in of images to the extraction of target regions in this three-dimensional position measuring apparatus.
Figure 5:
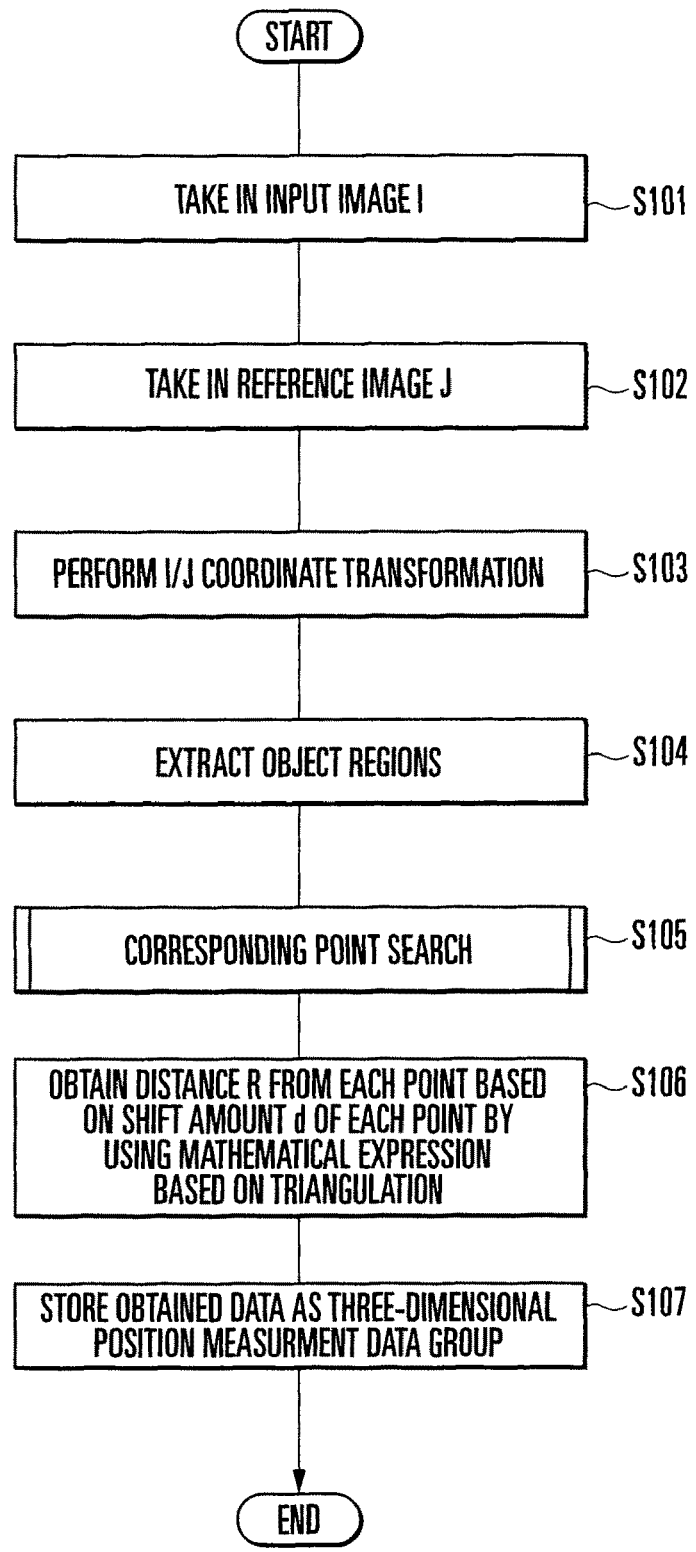
FIG. 5 is a flowchart showing three-dimensional position measurement processing in this three-dimensional position measuring apparatus.

The control unit 20-1 takes in, as an input image (FIG. 4: S1), the image I of the object M captured by the camera 10 (step S101 in FIG. 5). The control unit 20-1 also takes in, as a reference image, the image J (FIG. 4:S2) of the object M captured by the camera 11 (step S102).

[Coordinate System Transformation]

The control unit 20-1 reads out a camera parameter CPR stored in the hard disk, and transforms each pixel data in the input image I and the reference image J into a coordinate system in which an axis parallel to the epipolar line EP calculated from the camera parameter CPR and a reference point is set as the X-axis, and an axis perpendicular to the X-axis is set as the Y-axis (step S103). The input image I and the reference image J after coordinate system transformation are set as an input image I' and a reference image J', respectively (FIG. 4: S3, S4).

[Extraction of Target Regions]

The control unit 20-1 extracts only regions where the object M (human face) exists from the input image I' and the reference image J' as corresponding point search target regions (to be referred to as object regions hereinafter) by edge detection (step S104). With this operation, the control unit 20-1 extracts object regions OB1 and OB2, thereby obtaining an input image I" and a reference image J" (FIG. 4: S4, S5, S6).

For the sake of simplicity, assume that the backgrounds other than the object M on the input image I and reference image J are solid color, and only regions where the object M exists are properly extracted as the object regions OB1 and OB2.

[Corresponding Point Search]

Figure 6:
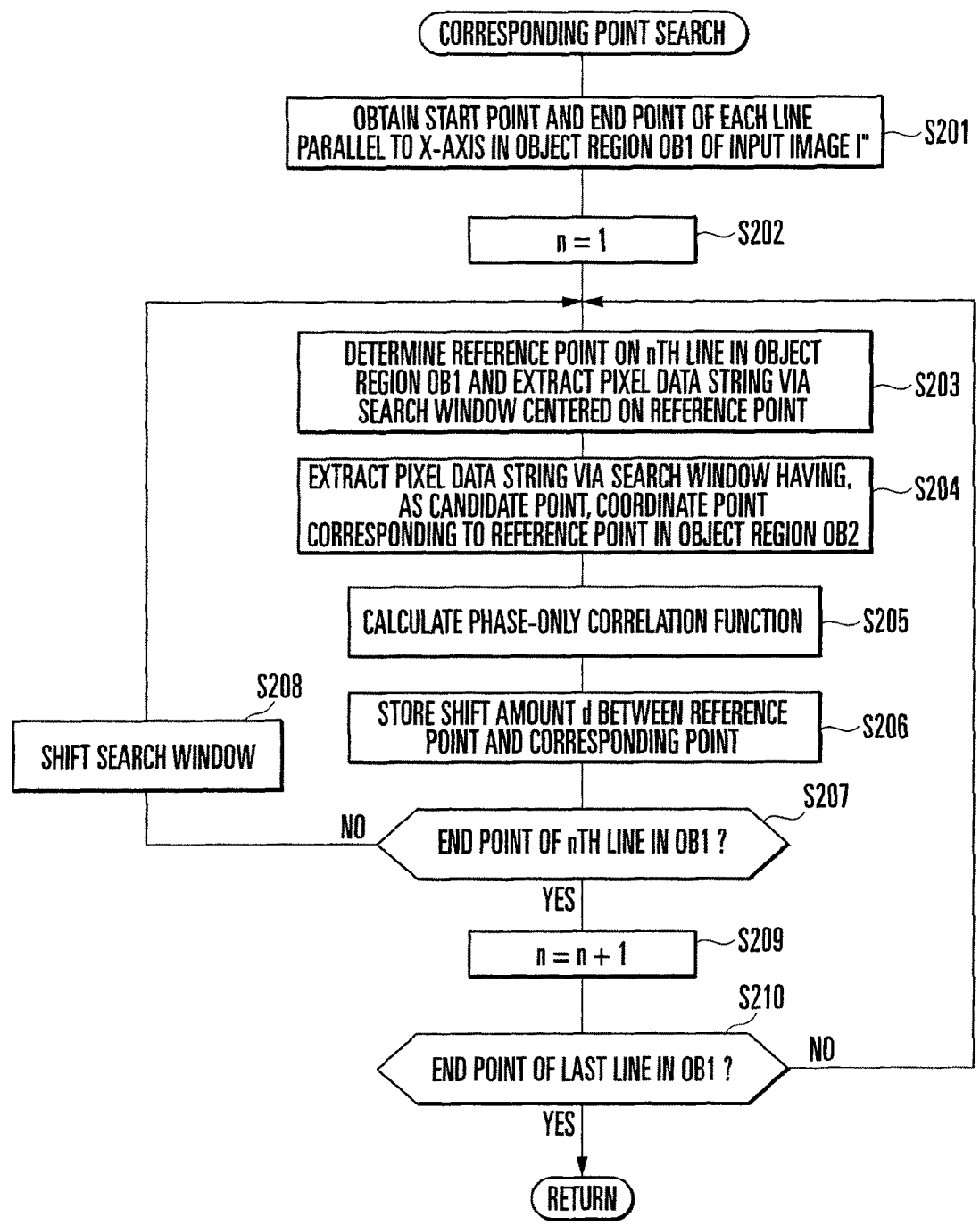
FIG. 6 is a flowchart showing corresponding point search processing in a three-dimensional position measurement processing sequence in this three-dimensional position measuring apparatus.

The control unit 20-1 then searches for corresponding points in the object regions OB1 and OB2 in the input image I" and reference image J" as target regions (step S105). FIG. 6 is a flowchart showing corresponding point search processing in step S105. The control unit 20-1 performs a corresponding point search in accordance with this flowchart in the following manner.

First of all, the control unit 20-1 obtains the start point (ST) and end point (END) of each line (with a width of one pixel) parallel to the X-axis in the object region OB1 on the input image I" (step S201).

Figure 7:
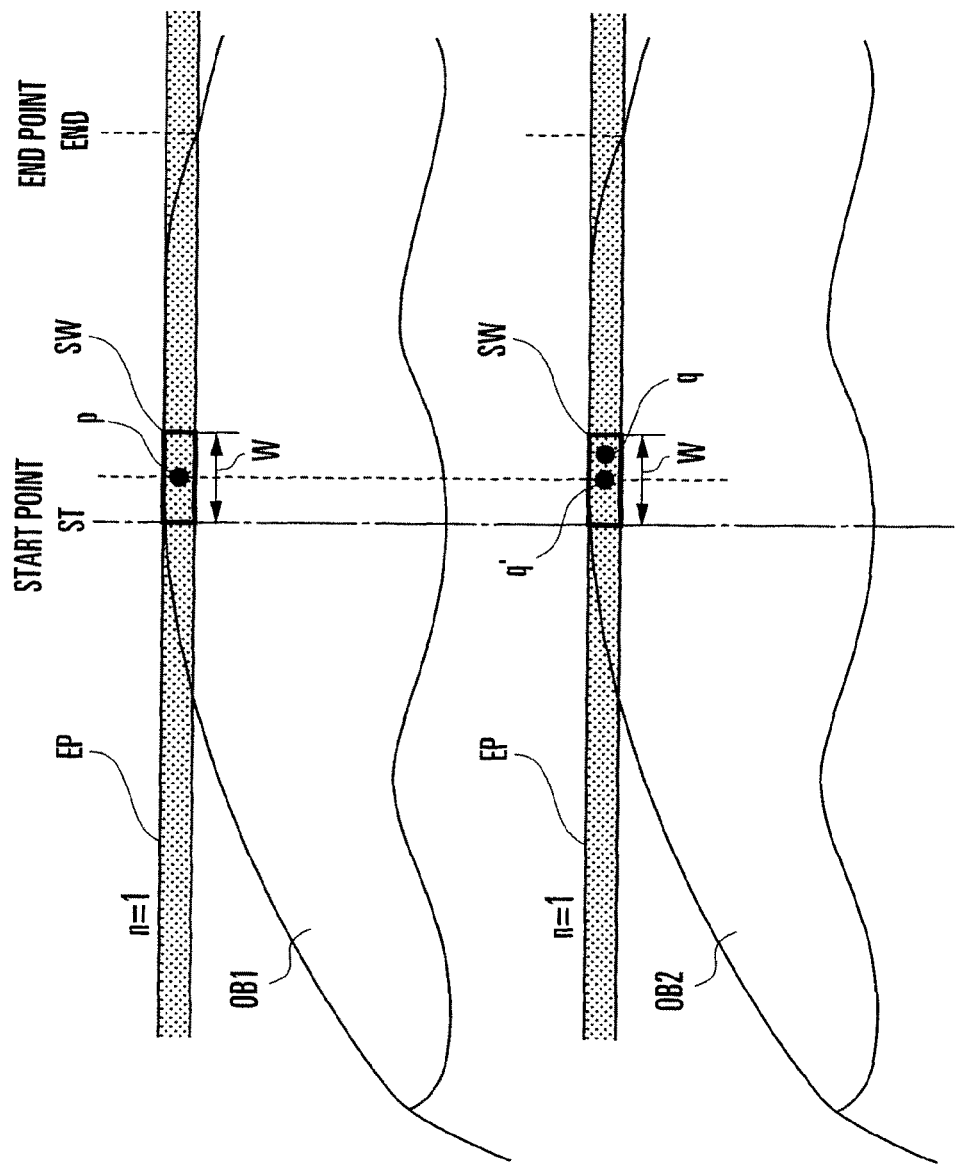
FIG. 7 is a view for explaining how a corresponding point search starts from a start point on the top-level line in an object region extracted from an input image.

The control unit 20-1 sets the line number of the top-level line in the object region OB1 to n=1 (step S202), determines the reference point p on the (n=1) line, and extracts a pixel data string in a search window SW with a predetermined width W centered on the reference point p as a pixel data string at the reference point p (step S203). In this case, a data string of pixels in the search window SW having a width W of 32 pixels from the start point ST (see FIG. 7) of the (n=1) line (to be referred to as a search line hereinafter) is extracted as a pixel data string at the reference point p.

In this case, the (n=1) search line is the epipolar line EP at the reference point p. The pixel data string at the reference point p is cut out along the epipolar line EP. The pixel data string at this reference point is a one-dimensional pixel data string.

The control unit 20-1 sets a coordinate point corresponding to the reference point p in the object region OB2 as a candidate point q', determines a search window CW with width W=32 pixels centered on the candidate point q', and extracts a data string of pixels in the search window CW as a pixel data string at the candidate point q' (step S204).

In this case, the (n=1) search line is the epipolar line EP at the candidate point q'. A pixel data string at the candidate point q' is cut out along the epipolar line EP. The pixel data string at this candidate point is a one-dimensional pixel data string.

The control unit 20-1 calculates a phase-only correlation function from the pixel data string at the reference point p extracted in step S203 and the pixel data string at the candidate point q' extracted in step S204 (step S205). The control unit 20-1 uses a one-dimensional phase-only correlation method (one-dimensional POC) for the calculation of this phase-only correlation function. A phase-only correlation function is calculated by this one-dimensional POC in the following manner.

The control unit 20-1 sets, as first image data G1, the pixel data string at the reference point p extracted in step S203 (see FIG. 8), and sends the first image data G1 to the Fourier transform unit 20-7 to perform one-dimensional Fourier transform for the first image data G1. With this operation, the first image data G1 becomes Fourier image data F1.

The control unit 20-1 sets the pixel data string at the candidate point q' extracted in step S204 as second image data G2 (see FIG. 8), and sends the second image data G2 to the Fourier transform unit 20-7 to perform one-dimensional Fourier transform for the second image data G2. With this operation the second image data G2 becomes Fourier image data F2.

The control unit 20-1 combines the Fourier image data F1 with the Fourier image data F2, normalizes the amplitude component of the combined Fourier image data (composite Fourier image data), and sends the resultant data to the Fourier transform unit 20-7 to perform one-dimensional Fourier transform again.

Figure 8:
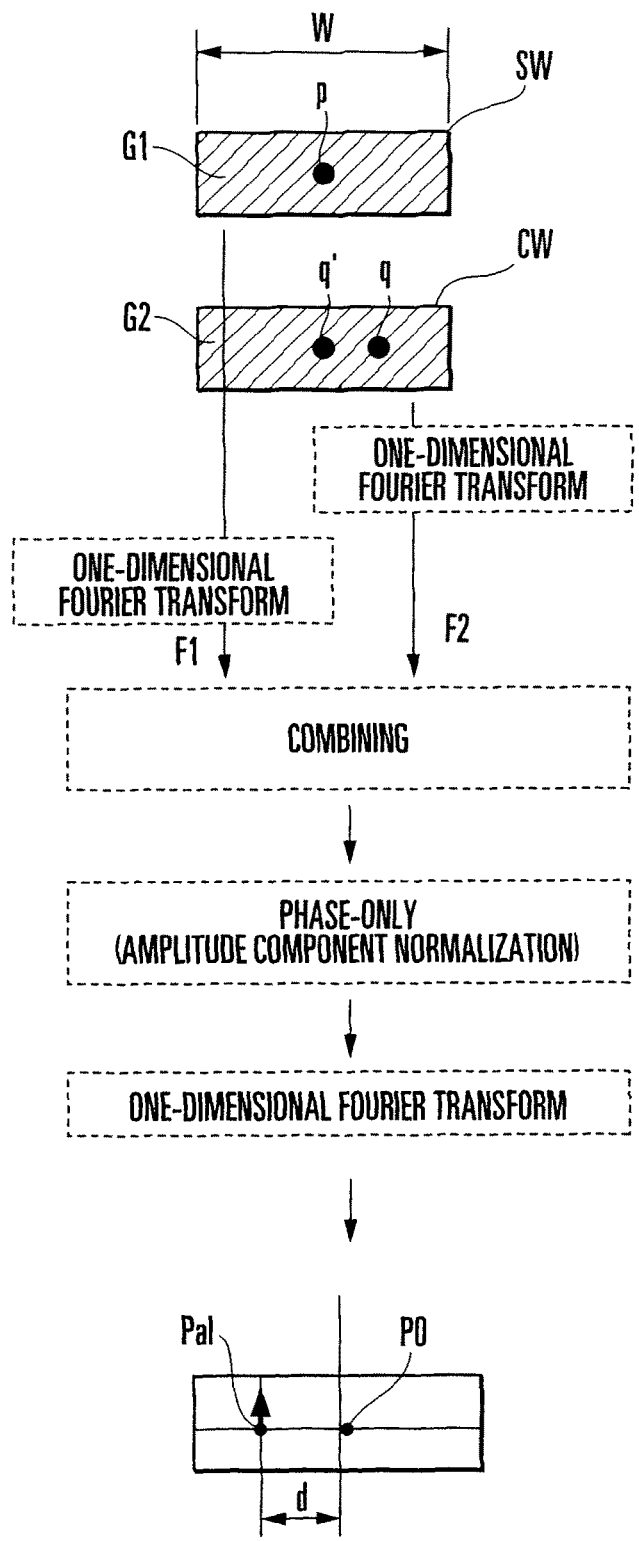
FIG. 8 is a view for explaining the calculation of a correlation function by a one-dimensional phase-only correlation method between a data string at a reference point and a data string at a candidate point.

The control unit 20-1 then obtains the intensity (amplitude) of the correlation component of each pixel in a predetermined correlation component area from the composite Fourier image data having undergone this one-dimensional Fourier transform, and sets, as a correlation peak, the intensity value of a correlation component having the highest intensity in the correlation component area, and obtains a position Pa1 of the correlation peak (see FIG. 8). In this processing sequence, the processing of obtaining a correlation peak corresponds to the calculation of a phase-only correlation function.

In this case, a distance d from a center P0 of the correlation component area to the position Pa1 of the correlation peak indicates the shift amount between the image in the search window SW and the image in the search window CW, i.e., the shift amount between the reference point p in the search window SW and the corresponding point q in the search window CW. The control unit 20-1 stores the shift amount d between the reference point p and the corresponding point q in correspondence with the reference point p (step S206).

Subsequently, in the same manner, the control unit 20-1 repeats the same processing while shifting a reference point on the (n=1) search line in the object region OB1 a predetermined number of pixels (e.g., one pixel) at a time, i.e., shifting the search window SW a predetermined number of pixels at a time (step S208).

Upon completing a corresponding point search up to the end point END of the (n=1) search line in the object region OB1 (YES in step S207), the control unit 20-1 shifts the search window SW to the start point of the (n=2) search line in the object region OB1 (step S209). Subsequently, in the same manner, the control unit 20-1 repeats the same operation up to the end point of the last search line in the object region OB1.

[Measurement of Three-Dimensional Positions]

Upon completing a corresponding point search concerning all the reference points in the object region OB1 (YES in step S210), the control unit 20-1 calculates a distance R from each camera to the corresponding point (reference point) on the object M, based on the shift amount d between each reference point and each corresponding point, by equation (2) based on the triangulation principle (step S106 (FIG. 5)).

$$R = f \cdot L / d \quad (2)$$

The control unit 20-1 then stores, in the hard disk, the measurement data of the three-dimensional position of each point upon setting the calculated distance R from each camera to the corresponding point (reference point) of the object M as the measurement data of a three-dimensional position. The control unit 20-1 reads out the measurement data group of three-dimensional positions stored in the hard disk as needed, and displays them on the screen of the LCD 12 or sends them to a host apparatus.

As is obvious from the above description, in this embodiment, the pixel data string at the reference point p is a one-dimensional pixel data string, the pixel data string at the candidate point q', whose correlation with the pixel data string at the reference point p is to be obtained, is also a one-dimensional pixel data string, and a phase-only correlation function is calculated from the pixel data string at the reference point p and the pixel data string at the candidate point q' by using the one-dimensional POC. The one-dimensional POC performs one-dimensional Fourier transform, and hence greatly reduces the calculation amount required for a corresponding point search, thereby obtaining a matching result in a short period of time. In addition, using the one-dimensional POC can remove correlation error factors in a direction perpendicular to the epipolar line EP, and hence can implement an accurate corresponding point search.

In the above embodiment, the search window SW on the reference point p has the same width W as that of the search window CW on the candidate point q'. However, the width W of the search window CW on the candidate point q' can be equal to or more than the width W of the search window SW on the reference point p, and the search window CW can be the entire range from the start point ST to the end point END of one search line.

In the above embodiment, a one-dimensional pixel data string is cut out from each image along the epipolar line EP, and a corresponding point search is performed from the phase-only correlation function of the cut one-dimensional pixel data string. However, it suffices to cut out a one-dimensional pixel data string from each image along a line parallel to the epipolar line EP near the one-dimensional pixel data string and perform a corresponding point search from the phase-only correlation function of the plurality of pairs of one-dimensional pixel data strings. This makes it possible to reduce the influence of noise and implement more stable corresponding point search performance.

For example, as shown in FIG. 9, neighboring search windows SW1 to SW4 having the same length from the same position as that of a search window SW (SW0) in the input image I″ are determined so as to be parallel to the search window SW0. The correlation values of the respective pairs of pixel data strings in the search window SW0 and the neighboring search windows SW1 to SW4 and the pixel data strings in a search window CW0 and neighboring search windows CW1 to CB4 in the reference image J″ are obtained, and the average of the correlation values is calculated. Obtaining the maximum peak position of the average correlation value will calculate the shift amount between the reference point p and the corresponding point q.

In this case, one-dimensional Fourier transform is performed for the pixel data strings in the search window SW0 and neighboring search windows SW1 to SW4, and one-dimensional Fourier transform is performed for the pixel data strings in the search window CW0 and neighboring search windows CW1 to CW4. The pixel data string in the search window SW0 having undergone Fourier transform is combined with the pixel data string in the search window CW0. Likewise, the pixel data strings in the neighboring search windows SW1 to SW4 having undergone Fourier transform are respectively combined with the pixel data strings in the neighboring search windows CW1 to CW4. A composite phase spectrum is generated by averaging the five composite Fourier image data obtained by this operation. One-dimensional Fourier transform is then performed for this composite phase spectrum to obtain the position of the maximum correlation peak. This method can greatly increase the processing speed as compared with the method of obtaining the position of a correlation peak by performing one-dimensional Fourier transform for each of the five composite Fourier image data.

Figure 11:
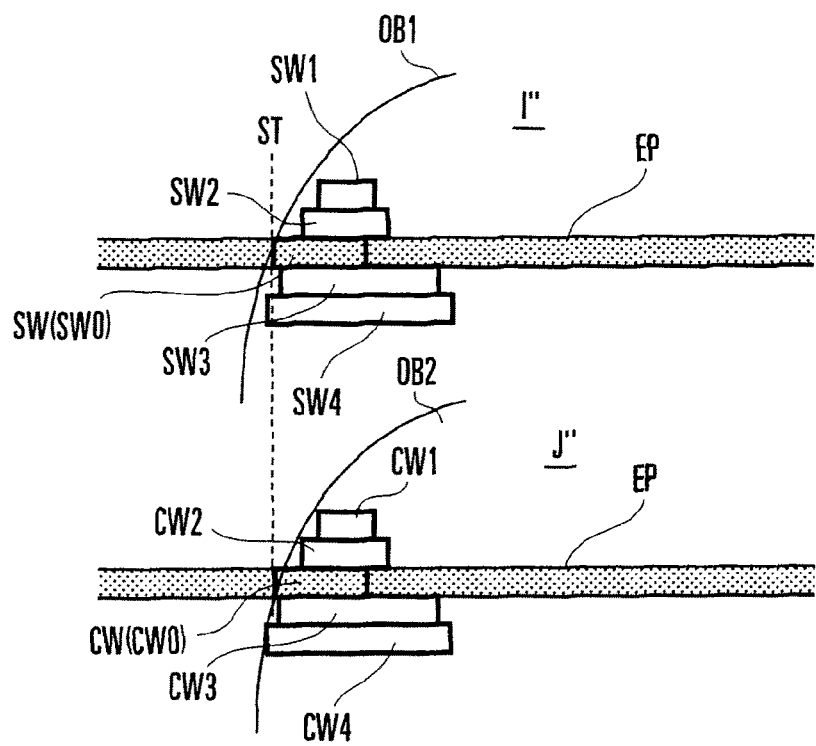
FIG. 11 is a view for explaining a modification of the example of how to search for corresponding points by determining a plurality of pairs of neighboring search windows parallel to search windows.
Figure 12:
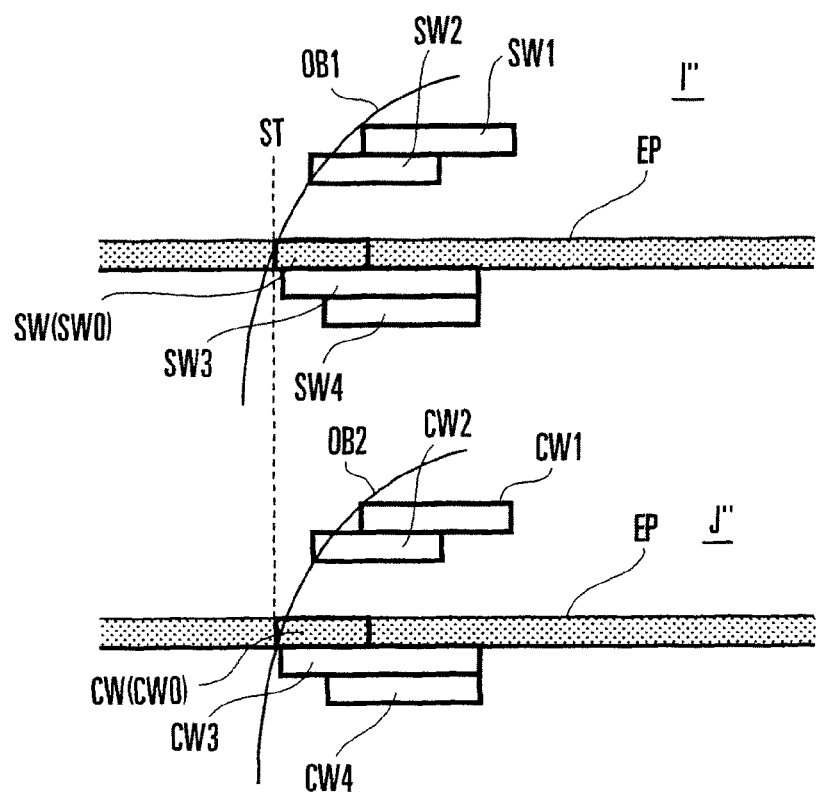
FIG. 12 is a view for explaining a modification of the example of how to search for corresponding points by determining a plurality of pairs of neighboring search windows parallel to search windows.

Referring to FIG. 9, the neighboring search windows SW1 to SW4 having the same length from the same position in the horizontal direction of the image are determined so as to be parallel to the search window SW0. However, as shown in FIG. 10, it suffices to determine the neighboring search windows SW1 to SW4 having the same length from different positions in the horizontal direction of the image. In addition, as shown in FIG. 11, it suffices to determine the neighboring search windows SW1 to SW4 having different lengths from different positions in the horizontal direction of the image. Furthermore, as shown in FIG. 12, it suffices to determine the neighboring search windows SW1 to SW4 having different lengths from different positions on the image.

In the above embodiment, the input image I and the reference image J are coordinate-transformed in step S103. However, it is not always necessary to perform coordinate transformation. The epipolar lines EP existing in the images captured by the cameras 10 and 11 are not always horizontal, and may be inclined. The epipolar lines EP are ideally horizontal but are often inclined due to mounting errors of the cameras 10 and 11 and the like. For this reason, this embodiment is configured to transform each image to a coordinate system having an axis parallel to the epipolar line EP as one axis, and an axis perpendicular to it as the other axis. Although it suffices to perform a corresponding point search without changing the epipolar line EP in an inclined coordinate system, transforming the coordinate system will facilitate the subsequent processing. Note that if the epipolar lines EP are parallel, there is no need to perform coordinate system transformation.

The above embodiment is configured to extract the object regions OB1 and OB2 from the input image I′ and the reference image J′ by edge detection. However, it is not always necessary to extract the object regions OB1 and OB2. For example, it suffices to perform matching processing for the reference point p and the corresponding point q while moving the reference point p from the start point of the top-level search line of each of the input image I′ and the reference image J′ to the end point of the bottom-level search line, i.e., moving the search window SW, without extracting the object regions OB1 and OB2.

In this case, since the phase-only correlation function between the image data string at the reference point p and the one-dimensional pixel data string at the candidate point q′ in the reference image J′ is calculated by one-dimensional POC while the reference point p is shifted in the entire region of the input image I′, the amount of data to be processed is large. In contrast to this, extracting the object regions OB1 and OB2 from the input image I′ and the reference image J′ and setting the extracted object regions OB1 and OB2 as search target regions can reduce the amount of data to be processed by reducing the region where the reference point p in the input image I′ is shifted. In addition, removing pixel data outside the object regions OB1 and OB2 in the images from processing targets can prevent the corresponding regions from acting as disturbance factors which decrease accuracy in a corresponding point search sequence, thereby improving the corresponding point search accuracy. Furthermore, starting a corresponding point search from the start point of a search line in the object region OB1 will always obtain a corresponding point from a position near the contour of the object M. This improves the accuracy of the measurement of a three-dimensional position on an object.

Although not described in the above embodiment, it suffices to reduce the resolutions of the input image I″ and reference image J″ when starting a corresponding point search and repeat stepwise the operation of calculating the phase-only correlation function between the pixel data string at a reference point and the pixel data string at a candidate point and increasing the resolutions of the input image I″ and reference image J″ if a correlation peak is obtained.

Although the above embodiment uses the two cameras, it suffices to obtain the input image I and the reference image J from one camera by providing an optical mechanism. In addition, a plurality of images can be obtained by using three or more cameras. Using one camera can easily implement an apparatus because there is no need to establish synchronization in hardware in terms of design. When an expensive mega-pixel camera is to be used, using one such camera can implement an inexpensive apparatus.

Although the above embodiment is configured to calculate the correlation function between the pixel data string at the reference point p and the pixel data string at the candidate point q′ by using the one-dimensional phase-only correlation method, it suffices to calculate it by a one-dimensional band limiting method, one-dimensional correlation coefficient method, or one-dimensional amplitude suppression correlation method.

A technique of matching images having undergone epipolar geometric correction by using a one-dimensional phase-only correlation method will be described next in more detail.

Figure 13A:
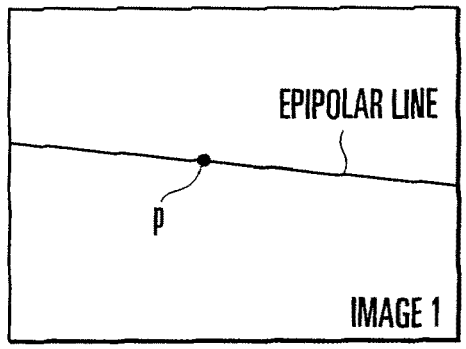
FIG. 13A is a view for explaining two images and one-dimensional image signals (before paralleling)
Figure 13A:
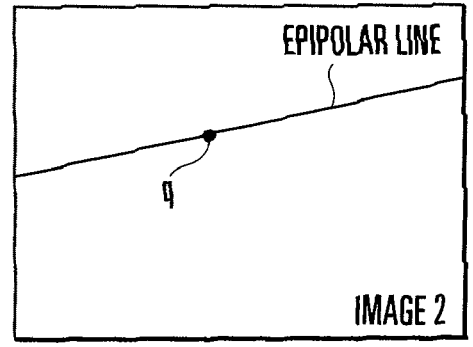
Figure 13B:
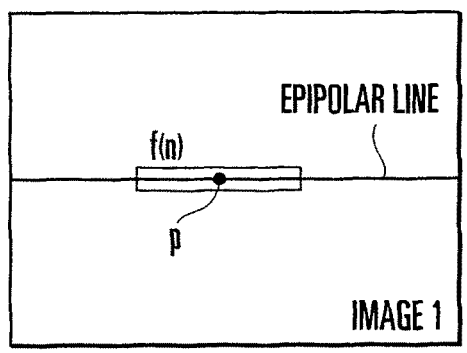
FIG. 13B is a view for explaining two images and one-dimensional image signals (after paralleling)
Figure 13B:
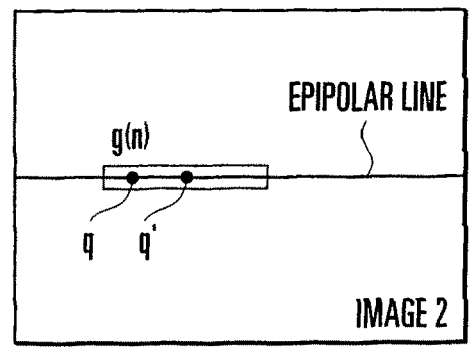

1. Basic Image Matching Technique Based on One-Dimensional Phase-Only Correlation Method Geometric correction (paralleling) is performed for two images to be matched such that their epipolar lines become parallel (see FIGS. 13A and 13B). As shown in FIG. 13B, assume that the two corrected images are images 1 and 2. Consider in this case that epipolar lines are aligned with each other in the horizontal direction, as shown in FIG. 13B. This case can be easily extended to the case of general paralleling. Consider a case in which a search is made for a corresponding point in image 2 which corresponds to a reference point in image 1.

First of all, as shown in FIG. 13B, a one-dimensional image signal centered on the reference point p is cut out from paralleled image 1, and is defined as f(n). In this case, the one-dimensional image signal f(n) is cut out by a finite length in the same direction as that of the epipolar line. Likewise, a one-dimensional image signal g(n) is cut out, centered on the point q' as a candidate of the corresponding point q to be searched for from paralleled image 2. The signal g(n) exists on an epipolar line corresponding to the reference point p. In this case, for the sake of convenience, the discrete spatial index of a one-dimensional image signal is set to n=−M, . . ., M, where M is a positive integer. A length N of a one-dimensional image signal is given by N=2M+1.

In this case, for the sake of simplicity, discrete spatial indexes are made positively and negatively symmetrical, and the length of a one-dimensional image signal is set to an odd-numbered value. However, these settings are not essential to the arrangement of this technique. That is, generalization can be made such that discrete spatial indexes equal to or more than 0 are used as is often generally used, and the length N of a one-dimensional image signal is set to an arbitrary positive integer. In general, calculation is often performed by setting N to a power of 2 and using fast Fourier transform (FFT) (N is set to a power of 2 in performance evaluation to be described later).

For a simple description of Fourier transform, the following will be described by using the above settings. In addition, the one-dimensional image signals f(n) and g(n) need not always be cut out, strictly centered on the reference point p and the corresponding candidate point q', and can be generally cut out so as to pass on them. In this case, one-dimensional discrete Fourier transforms of f(n) and g(n) are defined by

[Mathematical 1]

$$F(k) = \sum_{n=-M}^{M} f(n) W_N^{kn} = A_F(k) e^{j\theta_F(k)} \quad (3)$$

$$G(k) = \sum_{n=-M}^{M} g(n) W_N^{kn} = A_G(k) e^{j\theta_G(k)} \quad (4)$$

$$\text{for } W_N = e^{j\frac{2\pi}{N}}$$

In this case, $A_F(k)$ and $A_G(k)$ are respectively the amplitude components of the one-dimensional image signals f(n) and g(n), and $\theta_F(k)$ and $\theta_G(k)$ are respectively phase components. Assume that the discrete frequency index is set to k=−M, . . ., M. Like the discrete spatial index n, there is some degree of freedom in the manner of selecting an index for the discrete frequency k. In this case, a composite phase spectrum R(k) is given by

[Mathematical 2]

$$R(k) = \frac{F(k)\overline{G(k)}}{|F(k)\overline{G(k)}|} = e^{j\theta(k)} \quad (5)$$

where $\overline{G(k)}$ represents a complex conjugate of $\overline{G(k)}$, and $\theta(k)=\theta_F(k)-\theta_G(k)$. Note that if $|F(k)\overline{G(k)}|=0$ it is impossible to perform the calculation of equation (5). That is, some contrivance is required for the calculation.

This does not pose any serious problem in images captured by actual cameras. A one-dimensional phase-only correlation function r(n) of f(n) and g(n) is defined as one-dimensional inverse discrete Fourier transform of the composite phase spectrum R(k).

[Mathematical 3]

$$r(n) = \frac{1}{N} \sum_{k=-M}^{M} R(k) W_N^{-kn} \quad (6)$$

In this case, n=−M, . . ., M.

Consider a case in which the cut one-dimensional image signals f(n) and g(n) are slightly moved from each other. That is, the parallax included in f(n) and g(n) is estimated with subpixel resolution. Let fc(x) be a one-dimensional image signal defined on a continuous spatial variable x. The one-dimensional image signal finely moved by a real number δ is represented by fc(x−δ). In this case, assume that f(n) and g(n) are signals obtained by sampling fc(x) and fc(x−δ) at proper spatial sampling intervals T. That is, f(n) and g(n) are defined by the following equations.

[Mathematical 4]

$$f(n)=f_c(x)|_{x=nT} \quad (7)$$

$$g(n)=f_c(x-\delta)|_{x=nT} \quad (8)$$

For the sake of simplicity, assume that T=1. The following is a method of detecting a movement amount δ of a real number at this time with a resolution exceeding the sampling intervals. First of all, if δ is small, the following approximation holds for one-dimensional discrete Fourier transforms F(k) and G(k) of f(n) and g(n).

[Mathematical 5]

$$G(k) \approx F(k) e^{-j\frac{2\pi}{N}k\delta} \quad (9)$$

The above mathematical expression is an approximation because of the difference in Fourier transform characteristic between a continuous-time signal and a discrete-time signal. In this case, the composite phase spectrum R(k) and one-dimensional phase-only correlation function r(n) of F(k) and G(k) are given by

[Mathematical 6]

$$R(k) \approx e^{j\frac{2\pi}{N}k\delta} \quad (10)$$

$$r(n) \approx \frac{\alpha}{N} \frac{\sin\{\pi(n+\delta)\}}{\sin\left\{\frac{\pi}{N}(n+\delta)\right\}} \quad (11)$$

In this case, $\alpha=1$ and $n=-M, \ldots, M$. The above mathematical expression indicates a general form of a one-dimensional phase-only correlation function when the position of a one-dimensional image signal is shifted by $\delta$. In mathematical expression (11), $\alpha$ is a parameter introduced to express the height of a correlation value peak. Since it has been confirmed by experiment that when noise is added to the image, the value of $\alpha$ decreases, $\alpha \leq 1$ in practice.

If $\delta$ is an integer, mathematical expression (11) becomes a delta function. The peak of this function is located at $n=-\delta$, and the height of the peak is $\alpha$. Detecting the position of this peak from the actually calculated value of the one-dimensional phase-only correlation function r(n) can detect a positional shift $\delta$ between the cut one-dimensional image signals f(n) and g(n). That is, it is possible to obtain the corresponding point q in the one-dimensional image signal g(n) which corresponds to the reference point p in the one-dimensional image signal f(n) by using corresponding point candidates q' and $\delta$ according to the following equation:

[Mathematical 7]

$$q = q' + (\delta, 0) \quad (12)$$

Assume that in the above equation, q and q' are expressed as position vectors in an orthogonal coordinate system. In this case, the direction of the positional shift $\delta$ is set in the horizontal direction (the direction of a vector (1, 0)). In general, even if $\delta$ is a non-integer (real number), the coordinates of the corresponding point q can be obtained with subpixel accuracy by estimating $\delta$ using function fitting like that described in the next section.

2. Increase in Accuracy of Image Matching Technique Based on One-Dimensional Phase-Only Correlation Method This section describes an advanced technique based on the basic technique described in the above section, which accurately estimates the positional shift amount between the cut one-dimensional image signals f(n) and g(n).

A. Function Fitting Technique for Estimating Positional Shift Amount with Subpixel Accuracy In general, since the positional shift amount $\delta$ takes a real number and the peak coordinates of the one-dimensional phase-only correlation function exist between sampling lattice points, it is difficult to accurately estimate the positional shift amount $\delta$. Considering that a model of the peak shape of the one-dimensional phase-only correlation function is represented by the right-side function of mathematical expression (11), the position of the peak existing between pixels of an image can be estimated by fitting the function itself or a proper function (e.g., a quadric) approximately expressing the right side of mathematical expression (11) to the actually calculated numerical value data of the one-dimensional phase-only correlation function. In general, $\delta$ (and a if necessary) is a parameter to be estimated.

The following is an example of a technique of directly estimating $\delta$ and $\alpha$, based on the right side of mathematical expression (11), from the maximum value of the one-dimensional phase-only correlation function and neighboring numerical data. First of all, assume that the one-dimensional phase-only correlation function r(n) takes the maximum value when n=a (where a is an integer). In this case, it is possible to estimate $\delta$ and $\alpha$ by using three values, i.e., r(a) and neighboring values r(a−b) and r(a+b). In this case, b is a positive integer satisfying $-M \leq a-b < a < a+b \leq M$. More specifically, $\delta$ can be easily obtained by the following equation.

[Mathematical 8]

$$\tan\left(\frac{\pi}{N}\delta\right) = \frac{v(a, b)}{u(a, b)} \quad (13)$$

Note that u(a, b) and v(a, b) are given by

[Mathematical 9]

$$u(a, b) = r(a-b)\left\{\tan\left(\frac{\pi}{N}b\right) - \tan\left(\frac{\pi}{N}a\right)\right\} - \quad (14)$$
$$r(a+b)\left\{\tan\left(\frac{\pi}{N}b\right) + \tan\left(\frac{\pi}{N}a\right)\right\} + 2r(a)\tan\left(\frac{\pi}{N}a\right)\frac{\cos(\pi b)}{\cos\left(\frac{\pi}{N}b\right)}$$

$$v(a, b) = r(a-b)\left\{1 + \tan\left(\frac{\pi}{N}a\right)\tan\left(\frac{\pi}{N}b\right)\right\} + \quad (15)$$
$$r(a+b)\left\{1 - \tan\left(\frac{\pi}{N}a\right)\tan\left(\frac{\pi}{N}b\right)\right\} - 2r(a)\frac{\cos(\pi b)}{\cos\left(\frac{\pi}{N}b\right)}$$

In addition, $\alpha$ can be obtained from $\delta$ and mathematical expression (11). Various approximate expressions can be derived from the above mathematical expressions. In practice, the calculation can be simplified by using such approximate expressions.

The above technique is merely an example. It is possible to accurately estimate $\delta$ (and $\alpha$ if necessary) by fitting a proper function (e.g., a quadric) to the calculated numerical value of the one-dimensional phase-only correlation function by using the least squares method or the like. Note that the estimated height $\alpha$ of the correlation peak can be used as a measure indicating the reliability of matching between p and q. Using only corresponding point pairs (p, q) exhibiting large values of $\alpha$ can obtain a set of corresponding point pairs with less mismatches from two images. If $\alpha$ is very small, it can be regarded that the corresponding point q does not exist on g(n).

B. Application of Window Function for Reducing Discontinuity in Discrete Fourier Transform Since one-dimensional discrete Fourier transform is based on the assumption that a signal circulates, signal discontinuity at an end point poses a problem. In order to reduce the influence of this discontinuity and achieve high accuracy, it is important to apply a proper window function (a Hanning window, Gaussian window, or the like) to the input one-dimensional image signals f(n) and g(n).

For example, such a window function includes the following Hanning window.

[Mathematical 10]

$$w(n) = \frac{1 + \cos\left(\frac{\pi n}{M}\right)}{2} (n = -M, \ldots, M) \quad (16)$$

C. Application of Spectrum Weighting Function

It is known that in the case of a natural image, in general, its energy concentrates on low-frequency components, and the energy of high-frequency components is relatively low. For this reason, when disturbance is added to high-frequency components due to the influences of aliasing, blur, noise, distortion, or the like, the S/N ratio of the high-frequency components of the image greatly deteriorates. In order to suppress the influences of the high-frequency component with poor reliability, the spectrum weighting function is applied.

More specifically, each frequency component is weighted by multiplying a composite phase spectrum R(k) by a spectrum weighting function H(k) having an arbitrary characteristic. In general, high-frequency components with poor reliability can be effectively removed by applying a low-pass type spectrum weighting function (a square filter, Gaussian filter, or the like). Note, however, that when the spectrum weighting function H(k) is to be used, since the one-dimensional phase-only correlation function r(n) is defined as one-dimensional discrete Fourier transform of H(k) R(k), the peak shape model differs from that of mathematical expression (11). It is therefore necessary to use different peak shape models depending on H(k). In this case as well, various techniques described in this specification can be basically applied.

As an example of the simplest spectrum weighting function H(k), the following is conceivable.

[Mathematical 11]

$$H(k) = \begin{cases} 1 & |k| \leq U \\ 0 & |k| > U \end{cases} \quad (17)$$

For $0 < U \leq M$. When this spectrum weighting function is used, a peak shape model corresponding to model expression (11) of the one-dimensional phase-only correlation function r(n) is given by

[Mathematical 12]

$$r(n) \approx \frac{\alpha}{N} \frac{\sin\left\{\frac{V}{N}\pi(n+\delta)\right\}}{\sin\left\{\frac{\pi}{N}(n+\delta)\right\}} \quad (18)$$

For V=2 U+1. It is therefore necessary to perform the function fitting in section A described above on the basis of the assumption of the above mathematical expression. In this manner, the technique proposed in this specification can be generalized so as to use different peak shape models in accordance with the spectrum weighting function H(k).

D. Application of One-Dimensional Band-Limited Phase-Only Correlation Function

It is possible to use a band-limited type phase-only correlation function instead of the spectrum weighting function so as to remove the influences of high-frequency components with poor reliability. The one-dimensional band-limited phase-only correlation function is obtained by changing equation (6) as follows:

[Mathematical 13]

$$r(n) = \frac{1}{L} \sum_{k=-K}^{K} R(k) W_L^{-kn} \quad (19)$$

$(k = -K, \ldots, K)$

For $0 < K \leq M$ and L=2K+1. That is, the one-dimensional band-limited phase-only correlation function is obtained by limiting the one-dimensional discrete Fourier transform domain included in the calculation of the one-dimensional phase-only correlation function r(n) in accordance with the effective band (k=−K, . . . , K) of the signal. A peak shape model corresponding to mathematical expression (11) is given by

[Mathematical 14]

$$r(n) \approx \frac{\alpha}{L} \frac{\sin\left\{\pi\left(n+\frac{L}{N}\delta\right)\right\}}{\sin\left\{\frac{\pi}{L}\left(n+\frac{L}{N}\delta\right)\right\}} \quad (20)$$

It should be noted that when the one-dimensional band-limited phase-only correlation function is used, the position of a correlation peak is given by n=−(L/N)δ. The function fitting in section A described above can be easily generalized so as to be performed based on the assumption of the above mathematical expression.

E. Increase in Reliability by Use of Plural of One-Dimensional Image Signals

There has been described the technique of obtaining the true corresponding point q by estimating the positional shift amount δ using the one-dimensional image signal f(n) extracted centered on the corresponding reference point p on image 1 and the one-dimensional image signal g(n) extracted centered on the candidate point q' on image 2. When, however, actually captured images are used, it is very difficult to determine the position of a peak with high reliability by using only a pair of one-dimensional image signals. The following will describe a method of estimating a peak position with higher reliability by extracting a plurality of pairs of one-dimensional image signals from near a corresponding point and synthesizing the correlation calculation results on the pairs.

Figure 14A:
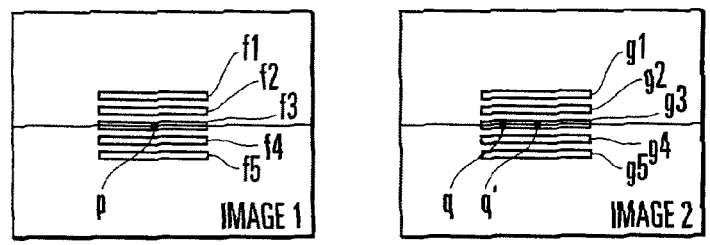
FIG. 14A is a view for explaining the extraction of one-dimensional image signals in a case in which one-dimensional image signals having the same length are extracted from the same positions on images in the horizontal direction.

First of all, B one-dimensional image signals $f_i(n)$ (i=1, 2, . . . , B) are extracted from near the reference point p on image 1. In addition, B one-dimensional image signals $g_i(n)$ (i=1, 2, . . . , B) are extracted from corresponding positions near the point q' on image 2. For example, FIG. 14A shows an example of how $f_i(n)$ and $g_i(n)$ are selected. In this case, B=5, and five one-dimensional image signals $f_i(n)$ and five one-dimensional image signals $g_i(n)$ are extracted from near p and q' in a regular arrangement. Accurately estimating the positional shift amount δ from the five pairs of one-dimensional image signals can obtain the true corresponding point q corresponding to the reference point p.

Assume that the one-dimensional phase-only correlation function of the one-dimensional image signals $f_i(n)$ and $g_i(n)$ is represented by $r_i(n)$, where i=1, 2, . . . , B. The weighted average of the B one-dimensional phase-only correlation functions $r_i(n)$ is defined as a cumulative correlation function $r_{all}(n)$.

[Mathematical 15]

$$r_{all}(n) = \frac{\sum_{i=1}^{B} w_i r_i(n)}{\sum_{i=1}^{B} w_i} \quad (21)$$

In this case, $w_i$ is a weighting factor accompanying $r_i(n)$, and can be selected to an arbitrary constant. The function $r_{all}(n)$ defined in this manner is a weighted and averaged one-dimensional phase-only correlation function. It is basically possible to apply all the techniques for higher accuracy described above to $r_i(n)$ and $r_{all}(n)$. That is, the discussion using the single one-dimensional phase-only correlation function r(n) can be easily extended to the use of $r_i(n)$ and $r_{all}(n)$.

Note that the following is conceivable as a technique of reducing a calculation amount. The composite phase spectrum of the one-dimensional image signals $f_i(n)$ and $g_i(n)$ is represented by $R_i(k)$, and a cumulative composite phase spectrum $R_{all}(k)$ is defined by

[Mathematical 16]

$$R_{all}(k) = \frac{\sum_{i=1}^{B} w_i R_i(k)}{\sum_{i=1}^{B} w_i} \quad (22)$$

In this case, since $r_{all}(n)$ is the one-dimensional discrete Fourier transform of $R_{all}(k)$, $r_{all}(n)$ can be calculated by calculating $R_{all}(k)$ in advance and performing one-dimensional discrete Fourier transform for the calculated value. If B is large, this calculation method is smaller in calculation amount than the method of performing one-dimensional discrete Fourier transform for each of $R_i(k)$ and $r_i(n)$.

Note that the technique described in this case can be generalized by various ways. Two important extensions of the technique will be described below.

As the manner of synthesizing $r_i(n)$ (i=1, 2, ..., B) into $r_{all}(n)$, various methods are conceivable, other than the linear combination defined by equation (21). In general, the function obtained by combining $r_i(n)$ by a proper nonlinear operator can be used as $r_{all}(n)$.

Figure 14B:
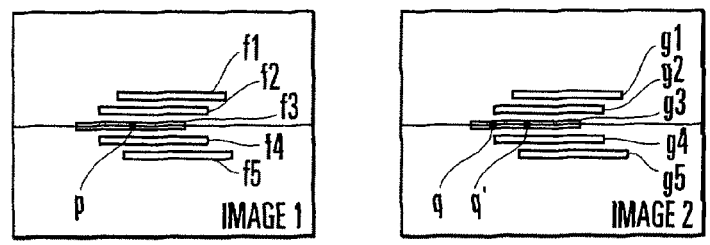
FIG. 14B is a view for explaining the extraction of one-dimensional image signals in a case in which one-dimensional image signals having the same length are extracted from different positions on images in the horizontal direction.
Figure 14C:
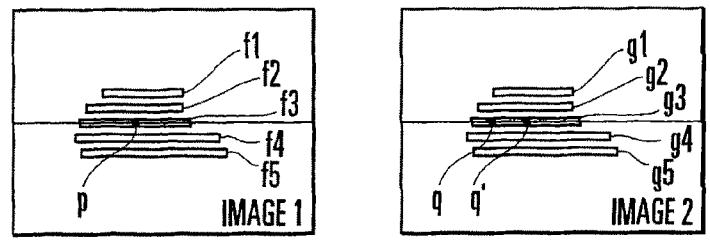
FIG. 14C is a view for explaining the extraction of one-dimensional image signals in a case in which one-dimensional image signals having different lengths are extracted from different positions on images in the horizontal direction.
Figure 14D:
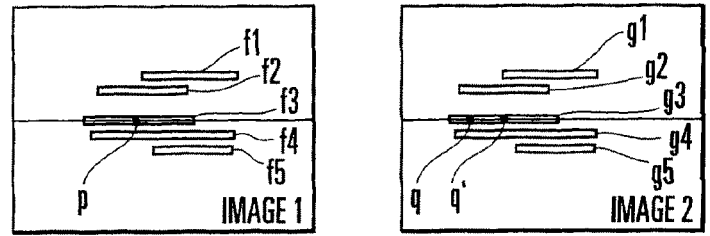
FIG. 14D is a view for explaining the extraction of one-dimensional image signals in a case in which one-dimensional image signals having different lengths are extracted from different positions on images.

The manner of selecting the one-dimensional image signals $f_i(n)$ and $g_i(n)$ need not be a method using a regular arrangement like that shown in FIG. 14A. For example, the method can use an arbitrary arrangement including the example shown in FIG. 14B. In addition, B one-dimensional image signals need not always have the same length. FIGS. 14C and 14D each show an example of such a case. If the B one-dimensional image signals have different lengths, the B functions $r_i(n)$ also have different lengths.

Figure 14E:
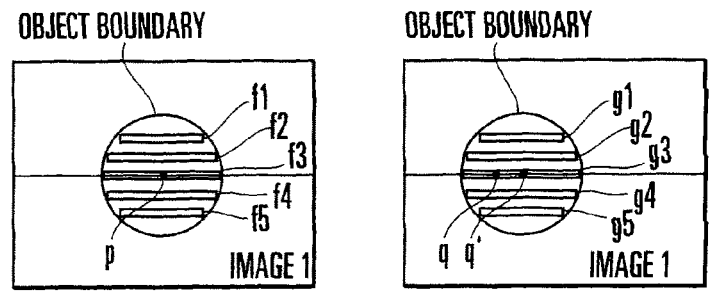
FIG. 14E is a view for explaining the extraction of one-dimensional image signals in a case in which one-dimensional image signals are extracted in accordance with object boundaries.

In this case, $r_{all}(n)$ can be obtained by adding $r_i(n)$ given by equation (21) upon aligning with a reference position (e.g., n=0). Actively using such degree of freedom can greatly improve the matching accuracy by using, for example, a method of extracting one-dimensional image signals so as not to straddle the boundary (edge) of an object included in the image. FIG. 14E shows an example of such an arrangement of one-dimensional image signals. In this case, the one-dimensional image signals are arranged such that their end points are aligned with the object boundary.

Techniques A to E described above can be variously combined in accordance with applications.

Figure 15:
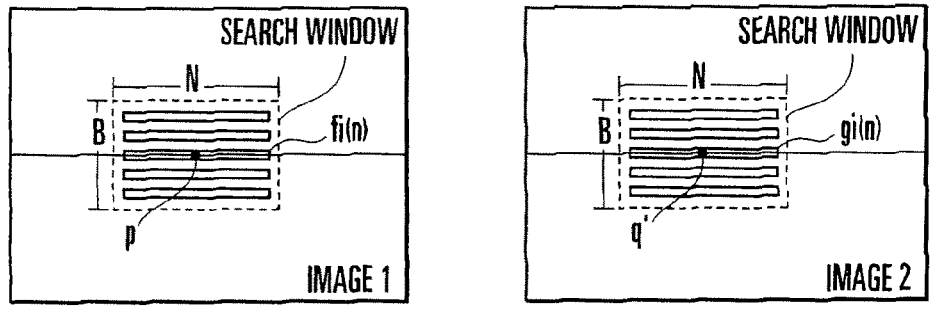
FIG. 15 is a view for explaining a search window setting method.

3. Image Matching Technique Based on Combination of One-Dimensional Phase-Only Correlation Method and Hierarchical Search Consider a simple case below in which the one-dimensional image signals $f_i(n)$ and $g_i(n)$ (i=1, 2, ..., B) are extracted from near the reference point p and the corresponding candidate point q', as shown in FIG. 15. Note that the technique to be described above can be easily extended to other cases.

In this case, the image region of N×B pixels indicated by the broken line in FIG. 15 will be referred to as a search window. In the techniques described above, it is implicitly assumed that the true corresponding point q exists near the candidate point q' in the search window. As a technique for always holding this assumption in actual stereo image matching, a combination of matching based on the one-dimensional phase-only correlation method and a hierarchical search based on a coarse-to-fine strategy will be described. This technique makes it possible to perform robust matching of image pairs acquired by general stereo cameras.

The algorithm to be described below is the one for performing geometric correction (paralleling) for two images (images 1 and 2) to be matched such that their epipolar lines become parallel, searching for the corresponding point q on image 2 which corresponds to reference point p on image 1, and repeating obtainment of the coordinates of the corresponding point with higher subpixel resolution if it exists, as described above. Searching for the corresponding point q by using this algorithm while changing the reference point p throughout the entire region of image 1 can perform matching of the entire regions of images 1 and 2 with a subpixel resolution.

Figure 16:
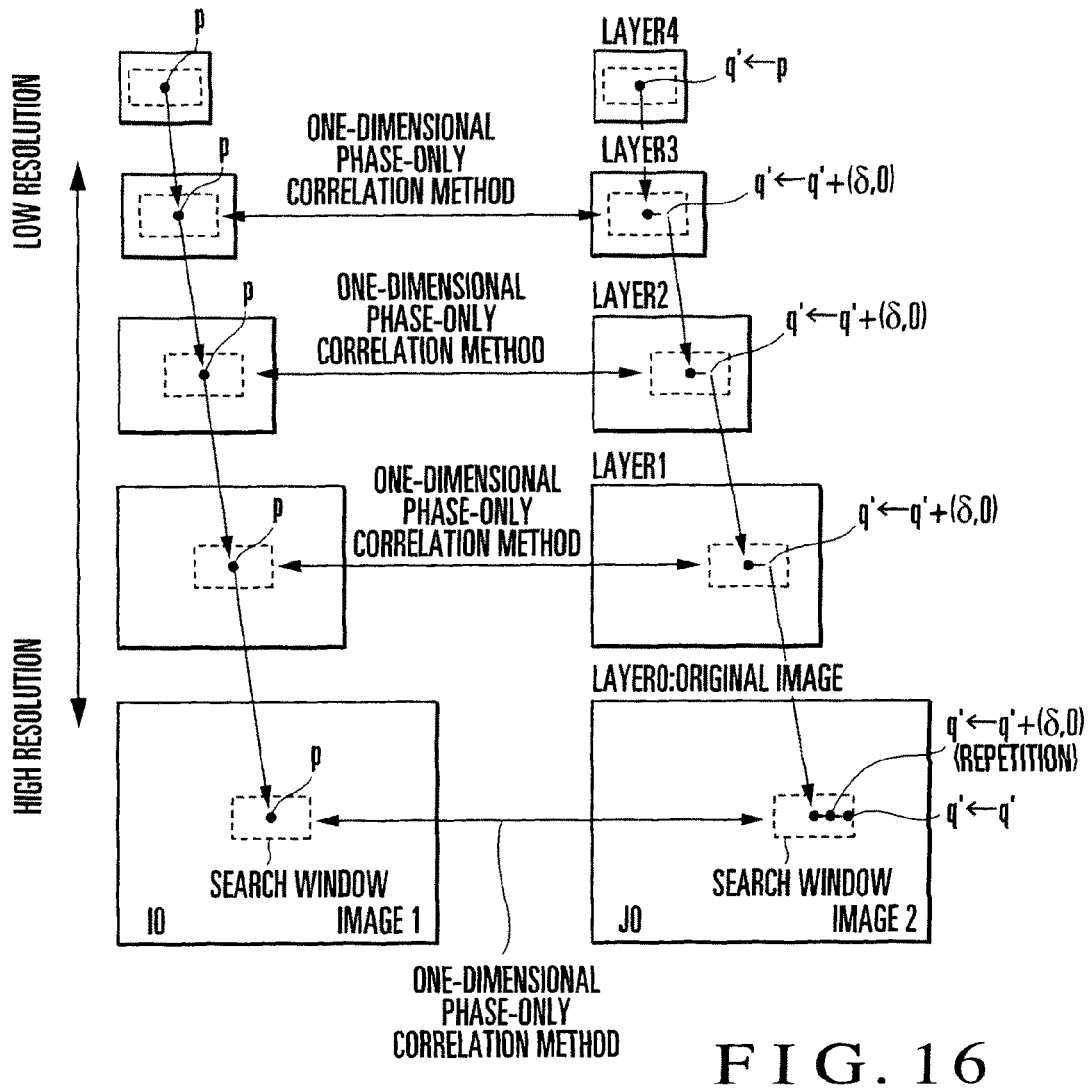
FIG. 16 is a view for explaining an outline of a subpixel matching algorithm using an image pyramid.

In this corresponding point search, the coarse-to-fine strategy is used. FIG. 16 is a schematic view showing a hierarchical search based on the coarse-to-fine strategy using multiresolution images. When the coarse-to-fine strategy is to be performed by using multiresolution images, the size (N×B pixels) of a search window is generally fixed, and a plurality of low-resolution images whose resolutions are decreased stepwise are prepared concerning each of images 1 and 2. A hierarchical search is then performed. This makes it possible to change the search range relative to images for each layer.

It is, however, not essential for the coarse-to-fine strategy to use multiresolution images. It is possible to narrow down candidate positions of the corresponding point q by performing a hierarchical search while simply changing stepwise (gradually reducing) the size of the search window on an original image. The following describes a corresponding point search algorithm in a case in which multiresolution images are used. Note that all searches are performed on epipolar lines (the same horizontal line on paralleled images).

Image Matching Algorithm Based on Combination of One-Dimensional Phase-Only Correlation Method and Hierarchical Search (When Multiresolution Images Are Used)

Input:
Images 1 and 2 (paralleled in advance)
Reference point p (p representing a coordinate vector) on image 1

Output:
Corresponding point q (q representing a coordinate vector) on image 2

If, however, there is no reliable corresponding point, "no corresponding point" is output.

Processing Sequence:
Step 1: Multiresolution images are generated. Lower-resolution images are generated at upper layers, and higher-resolution images are generated at lower layers. The original image is located at the lowermost layer. Assume that in the following description, the reference point p, corresponding point q, and corresponding candidate point q' are all expressed by position vectors on the image coordinate system converted to the original images (images 1 and 2). That is, assume that a low-resolution image at an upper layer is displayed upon conversion of the position of a point into the coordinate system of the original image. Assume also that both images 1 and 2 are defined on a common image coordinate system.

Step 2: At the uppermost layer with the lowest resolution, the initial value of a corresponding candidate point is set to q'←p, and a search is started. That is, assume that a sufficient number of layers are set to hold this assumption. The current search layer is set to the uppermost layer.

Step 3: At the current search layer, search windows for images 1 and 2 are set centered on the reference point p and the corresponding candidate point q', and the positional shift amount δ is accurately estimated by using the one-dimensional phase-only correlation method described in the above section.

Step 4: The search candidate point q' is updated based on the positional shift amount δ by the following mathematical expression:

[Mathematical 17]

$$q' \leftarrow q'+(\delta,0) \quad (23)$$

This operation corresponds to equation (12) for obtaining a true corresponding point. If the current search layer is the lowermost layer (original image layer), the process advances to Step 5. Otherwise, the current search layer is set to the next lower layer, and the process advances to Step 3.

Step 5: At the lowermost layer (original image layer), search windows for images 1 and 2 are set centered on the reference point p and the corresponding candidate point q'. Note that in this case, the positions of the search windows are adjusted with subpixel accuracy by using a proper interpolation technique. It is possible to estimate the positional shift amount δ with subpixel accuracy by using the one-dimensional phase-only correlation method described in the above section.

Step 6: The search candidate point q' is updated based on the positional shift amount δ by the following mathematical expression:

[Mathematical 18]

$$q' \leftarrow q'+(\delta,0) \quad (24)$$

Step 5 and Step 6 are repeated until the positional shift amount δ becomes a sufficiently small value. If the positional shift amount δ converges to a minute value, the process advances to Step 7. If the positional shift amount δ does not converge to a minute value, "no corresponding point" is output, and the processing is terminated. Note that it suffices to advance to Step 7 upon repeating the above steps a predetermined number of times regardless of the value of the positional shift amount δ.

Step 7: If the peak value α in correlation calculation is small, "no corresponding point" is output, and the processing is terminated. Otherwise, q is output upon setting as q←q', and the processing is terminated.

The algorithm described above is based on the assumption of the standard arrangement of one-dimensional image signals shown in FIG. 15. However, this algorithm can be easily generalized. In addition, for example, the hierarchical searching method can be variously extended like general block matching.

3. Arrangement of Three-Dimensional Measuring System Using Proposed Technique

The image matching algorithm described in the above section is configured to search for the corresponding point q on image 2 which corresponds to the reference point p on image 1. Searching for corresponding points while changing the reference point p throughout the entire region of image 1 can perform matching with subpixel resolution for the entire images. A passive type three-dimensional measuring system with very high accuracy can be constructed by applying this matching technique to a stereo vision system using a plurality (two or more) of cameras.

In general, in a passive type stereo vision system using a plurality of cameras, the distance (baseline length) between the two stereo cameras which perform three-dimensional measurement is an important parameter for determining the measurement performance. The following tradeoffs exist.

Stereo Cameras with Long Baseline Length

In this case, although the three-dimensional point measurement accuracy is advantageously high, since large image distortion occurs between the two stereo cameras, it is difficult to automate a corresponding point search. In addition, corresponding points which can be obtained are limited to special points such as edges in images. This technique can rather be applied to geometric artificial objects, but is very difficult to apply to natural objects such as human faces. That is, the technique is generally poor in versatility.

Stereo Cameras with Short Baseline Length

Since image deformation between the two stereo cameras is small, it is relatively easy to automate a corresponding point search. That is, this technique has the potential to construct a versatile system. However, when a general pixel-accuracy matching algorithm is used, the three-dimensional measurement accuracy is very low. That is, this technique is almost impractical.

Owing to the above reasons, most conventional high-accuracy stereo vision systems use stereo cameras with a long baseline length, and hence can be applied to only limited applications. That is, this technique has a small impact in terms of practical application. In contrast, the image matching technique proposed in this application of the present invention can stably obtain the coordinates of corresponding points with subpixel resolution, and can also achieve high measurement accuracy when being applied to stereo cameras with a short baseline length.

Figure 17:
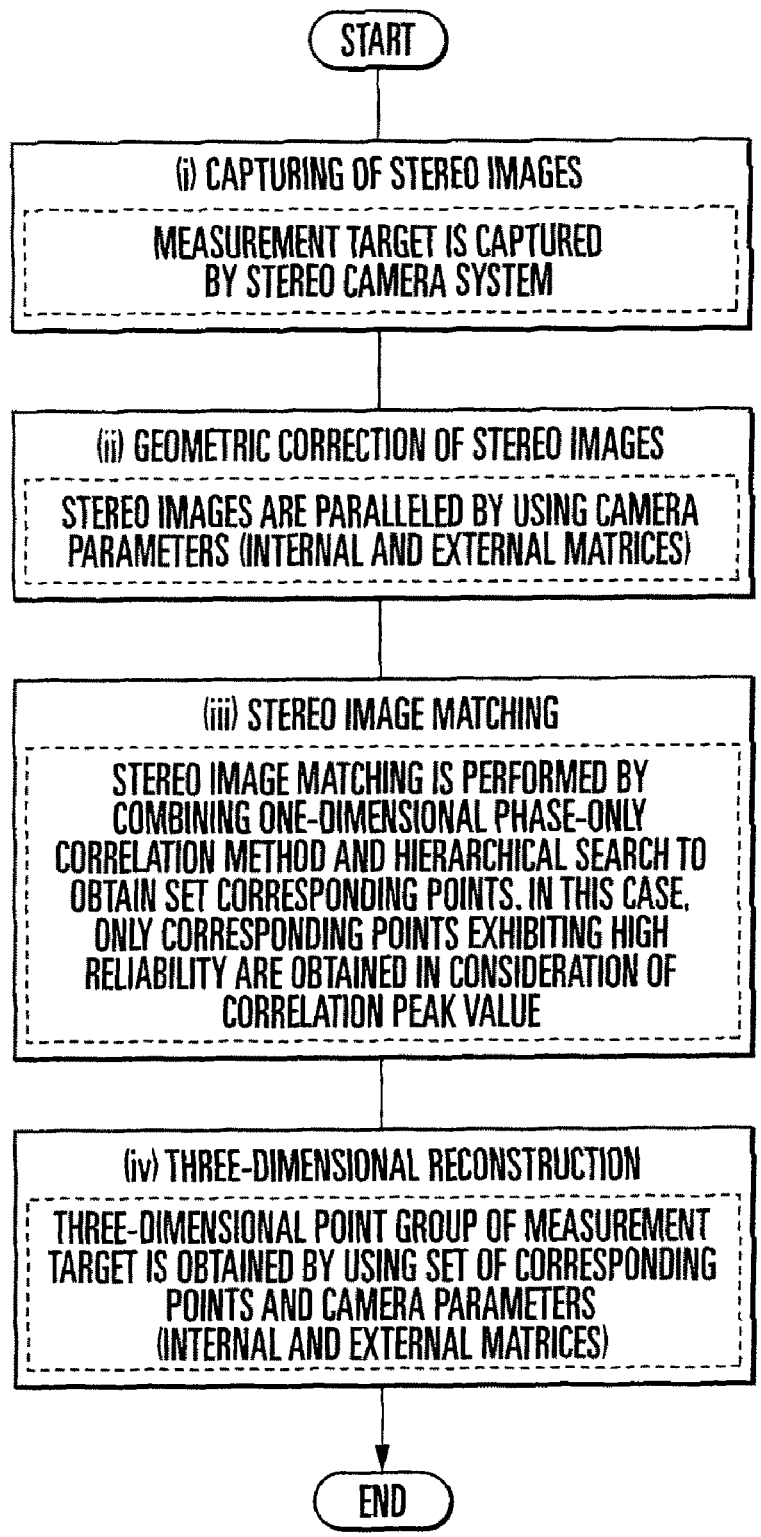
FIG. 17 is a flowchart exemplarily showing a three-dimensional measurement sequence.

FIG. 17 shows a three-dimensional measurement sequence using the proposed matching algorithm. Although this sequence is based on the assumption of a passive type stereo vision system using two cameras, this technique can be easily extended to a case in which three or more cameras are used. Assume that the cameras are calibrated and camera parameters (internal and external matrices) for the stereo camera system are obtained in advance (see reference 3 (Digital image processing editorial board, "Digital Image Processing", CG-ARTS Society, 2005), reference 5 (Yi Ma, Stefano Soatto, Jana Kosecka, S. Shankar Sastry, "An Invitation to 3-D Vision: From Images to Geometric Models (Interdisciplinary Applied Mathematics)", Springer, 2004), and reference 9 (JYO Go and Saburo Tsuji, "3-D Vision", Kyoritsu Publishing, 1998)).

A three-dimensional measurement sequence includes four steps, namely (i) capturing of stereo images, (ii) geometric correction of stereo images, (iii) stereo image matching, and (iv) three-dimensional reconstruction. In a stereo image matching step, in particular, outputting only corresponding point pairs whose correlation peak values α are large can finally obtain an accurate three-dimensional point group with high reliability.

4. Evaluation of Three-Dimensional Measuring System Using Proposed Technique

A three-dimensional measuring system is constructed, and the performance of a conventional matching technique is compared with that of a matching technique based on the one-dimensional phase-only correlation method. Four techniques for performance evaluation will be described below.

Matching Technique Using One-Dimensional Phase-Only Correlation Method: This is a technique to be proposed by the appended claims. This technique can stably obtain the coordinates of corresponding points with high subpixel resolution. It is possible to suppress the calculation amount required for this operation.

Matching Technique Using Two-Dimensional Phase-Only Correlation Method: This is a matching technique using the phase information of two-dimensional discrete Fourier transform of images. This technique can match two images with subpixel accuracy (see reference 6 (K. Takita, T. Aoki, Y. Sasaki, T. Higuchi, and K. Kobayashi, "High-accuracy subpixel image registration based on phase-only correlation," IEICE Trans. Fundamentals, vol. E86-A, no. 8, pp. 1925-1934, August 2003), reference 7 (K. Takita, M. A. Muquit, T. Aoki, and T. Higuchi, "A sub-pixel correspondence search technique for computer vision applications," IEICE Trans. Fundamentals, vol. E87-A, no. 8, pp. 1913-1923, August 2004), and reference 8 (M. A. Muquit, T. Shibahara, and T. Aoki, "A high-accuracy passive 3D measurement system using phase-based image matching," IEICE trans. Fundamentals, vol. E89-A, no. 3, pp. 686-697, March 2006)). The problem of this technique is that the calculation amount required for two-dimensional Fourier transform is large.

Matching Technique Using SAD (Sum of Absolute Differences): SAD is defined by the following equation (see references 3 and 4 (D. Scharstein and R. Szeliski. "A Taxonomy and Evaluation of Dense Two-Frame Stereo Correspondence Algorithms", IJCV 47 (1/2/3): 7-42, April-June 2002)).

[Mathematical 19]

$$R_{SAD} = \sum_{n_1=0}^{N_1-1} \sum_{n_2=0}^{N_2-1} |I(n_1, n_2) - J(n_1, n_2)| \quad (25)$$

In this case, $I(n_1, n_2)$ and $J(n_1, n_2)$ are the image blocks of images 1 and 2 subjected to matching by SAD. Assume that each image block has a size of $N_1 \times N_2$ pixels. Since calculation can be performed by only addition and subtraction, high-speed processing can be easily implemented. However, the matching accuracy is very low. Note that a technique called conformal linear fitting is used for the subpixel estimation of corresponding point coordinates (see reference 3).

Matching Technique Using SSD (Sum of Squared Differences): SSD is defined by the following equation (see references 3, 4, and 5).

[Mathematical 20]

$$R_{SSD} = \sum_{n_1=0}^{N_1-1} \sum_{n_2=0}^{N_2-1} (I(n_1, n_2) - J(n_1, n_2))^2 \quad (26)$$

In this case, $I(n_1, n_2)$ and $J(n_1, n_2)$ are the image blocks of images 1 and 2 subjected to matching by SSD. Assume that each image block has a size of $N_1 \times N_2$ pixels. Although the calculation amount is larger than that by SAD, a slightly better matching result can be obtained. Note that a technique called parabola fitting is used for the subpixel estimation of corresponding point coordinates (see reference 3).

A. Evaluation of Calculation Amount

As described above, the calculation amount in the one-dimensional phase-only correlation method is compared with the calculation amounts in the three conventional techniques. In this case, the calculation amounts required to find only one corresponding point in the respective techniques are compared with each other. When the one-dimensional phase-only correlation method is used, a search window is formed by cutting out B N-pixel one-dimensional images, as described in the above section. For the sake of simplicity, N is a power of 2.

In the matching technique using the two-dimensional phase-only correlation method, each image block to be cut out has a size of $N_1 \times N_2$ pixels. Note that $N_1$ and $N_2$ each are a power of 2. Note that a matrix factorization method using one-dimensional fast Fourier transform (FFT) is used in two-dimensional discrete Fourier transform calculation. One time of complex number multiplication is counted as four times of real number multiplication and two times of real number addition, and complex number addition is counted as two times of real number addition.

Likewise, in the matching technique using SAD (or SSD), each image block to be cut out has a size of $N_1 \times N_2$ pixels. The number times of SAD (or SSD) calculation required for a search for one point is represented by $N_1$. Note that as concrete numerical value examples for the comparison of calculation amounts, N=32, B=5, $N_1$=32, and $N_2$=32 are assumed. These values are standard values used for stereo image matching.

The numbers of times of multiplication are given by
one-dimensional phase-only correlation method: 2(2B+1) $N\log_2 N$+6BN=4,480 times
two-dimensional phase-only correlation method: $6N_1 N_2 \log_2(N_1, N_2)$+$6N_1 N_2$=67,584 times
SAD: 0 time
SSD: $N_1^2 N_2$=32,768 times The numbers of times of addition are given by
one-dimensional phase-only correlation method: 3(2B+1) $N\log_2 N$+(5B−1)N=6,016 times
two-dimensional phase-only correlation method: $9N_1 N_2 \log_2(N_1 N_2)$+$3N_1 N_2$=95,232 times
SAD: $N_1(2N_1 N_2-1)$=65,504 times
SSD: $N_1(N_1 N_2-1)$=32,736 times The numbers of times of division are given by
one-dimensional phase-only correlation method: 2BN+ 2N=384 times
two-dimensional phase-only correlation method: $2N_1 N_2$=2,048 times
SAD: 0 time
SSD: 0 time The numbers of times of square root calculation are given by
one-dimensional phase-only correlation method: BN=160 times
two-dimensional phase-only correlation method: $N_1 N_2$=1,024 times
SAD: 0 time
SSD: 0 time Using the one-dimensional phase-only correlation method for stereo image matching in this manner can greatly suppress the required calculation amount as compared with the two-dimensional phase-only correlation method. According to the above standard numerical value examples, the numbers of times of multiplication and addition can be suppressed to about 1/15 and about 1/16, respectively. This technique is expected to implement sufficiently high speed performance as compared with SAD and SSD.

B. Comparison in Three-Dimensional Reconstruction Performance

Stereo image matching is performed by combinations of the four matching techniques as evaluation targets and hierarchical searches based on the coarse-to-fine strategy, and three-dimensional reconstruction results are compared with each other. The same parameters as those in section A described above are used as parameters for each technique. That is, N=32, B=5, $N_1$=32, and $N_2$=32. Note that the number of layers of multiresolution images is five in a hierarchical search.

Figure 18A:
FIG. 18A is a view showing a paralleled stereo image of a face.
Figure 18A:
Figure 18B:
FIG. 18B is an explanatory view showing a three-dimensional reconstruction result on a face when a one-dimensional phase-only correlation method is used.
Figure 18B:
Figure 18C:
FIG. 18C is an explanatory view showing a three-dimensional reconstruction result on a face when a two-dimensional phase-only correlation method is used.
Figure 18C:
Figure 18D:
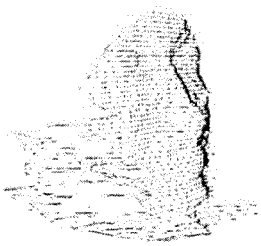
FIG. 18D is an explanatory view showing a three-dimensional reconstruction result on a face when SAD is used.
Figure 18D:
Figure 18E:
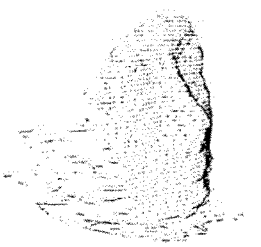
FIG. 18E is an explanatory view showing a three-dimensional reconstruction result on a face when SSD is used.
Figure 18E:
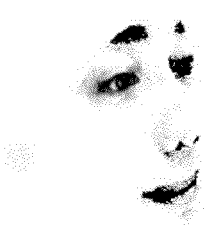
Figure 19:
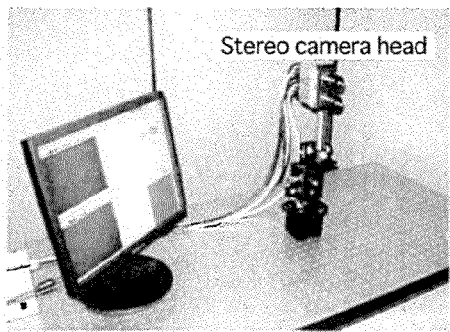
FIG. 19 is an explanatory view showing a stereo vision system used in an experiment for evaluating three-dimensional measurement accuracy.
Figure 19:
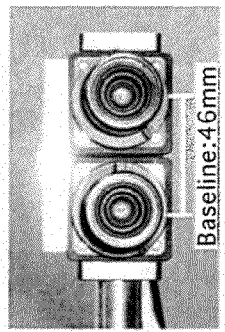

FIG. 19 shows the stereo vision system used in an experiment. In the stereo vision system, since a human face is an object, cameras are vertically arranged on a stereo camera head. FIGS. 18A to 18E show the three-dimensional reconstruction results obtained by the respective techniques. FIG. 18A shows stereo images acquired from the stereo camera head. Since the stereo camera head has the vertical camera arrangement, epipolar lines run parallel to the vertical coordinates of images.

In actual matching operation, therefore, the stereo images in FIG. 18A are rotated through 90° to correct the epipolar lines so as to make them run parallel to the horizontal coordinates of the images. That is, images like those shown in FIG. 13B are obtained. FIG. 18B shows the three-dimensional measurement result obtained by using the matching technique based on the one-dimensional phase-only correlation method. In contrast, FIGS. 18C to 18E respectively show the three-dimensional measurement results obtained by using the two-dimensional phase-only correlation method, SAD, and SSD. When SAD and SSD are used, three-dimensional points are reconstructed stepwise.

This is because sufficient subpixel accuracy is not obtained in matching. In contrast, when the one-dimensional phase-only correlation method and the two-dimensional phase-only correlation method are used, the three-dimensional curved shape of the human face is smoothly reconstructed. When a three-dimensional reconstruction result on an edge portion of the face is taken into consideration, it is obvious that a matching failure has occurred in use of the SAD and SSD. The one-dimensional phase-only correlation method can reduce the influence of an object boundary by reducing the size of a search window as compared with the two-dimensional phase-only correlation method, and hence can improve the three-dimensional reconstruction accuracy at an edge portion of the face. As described above, using the one-dimensional phase-only correlation method can reconstruct the three-dimensional shape of a human face with higher accuracy than the conventional techniques.

Industrial Applicability

The corresponding point searching method and three-dimensional position measuring method according to the present invention can be used for the measurement of any kinds of stereoscopic objects in various fields including image sensing, image/video signal processing, and computer vision.

The invention claimed is:

1. A corresponding point searching method comprising the steps of:
   taking in a plurality of images of an object when viewed from different viewpoints via image take-in means;
   cutting out one-dimensional pixel data strings from the plurality of images along epipolar lines calculated from a parameter for the image take-in means and a reference point; and
   searching for corresponding points in the plurality of images from a correlation between the one-dimensional pixel data strings cut out from the plurality of images;
   wherein the step of cutting out comprises the steps of cutting out one-dimensional pixel data strings from the plurality of images along the epipolar lines, and cutting out one-dimensional pixel data strings near the one-dimensional pixel data strings along lines parallel to the epipolar lines,
   and the step of searching comprises the step of searching for corresponding points in the plurality of images from a correlation obtained by synthesizing correlations taken between each of a plurality of corresponding pairs of one-dimensional pixel data strings cut out from the plurality of images.

2. A corresponding point searching method according to claim 1, further comprising the step of extracting object regions as corresponding point search target regions from the plurality of images,
   wherein the step of cutting out comprises the step of cutting out one-dimensional pixel data strings from the plurality of images along the epipolar lines, from the object regions extracted from the plurality of images, and cutting out one-dimensional pixel data strings near the one-dimensional pixel data strings along lines parallel to the epipolar lines.

3. A corresponding point searching method according to claim 1, further comprising the step of measuring three-dimensional positions of corresponding points based on parallax between the searched corresponding points.

4. A three-dimensional position measuring method comprising the steps of:
   taking in a plurality of images of an object when viewed from different viewpoints via image take-in means;
   cutting out one-dimensional pixel data strings from the plurality of images along an epipolar line calculated from a parameter for the image take-in means and a reference point, and cutting out one-dimensional pixel data strings near the one-dimensional pixel data strings along a line parallel to the epipolar line;
   searching for corresponding points in the plurality of images from a correlation obtained by synthesizing correlations taken between each of a plurality of corresponding pairs of the one-dimensional pixel data strings cut out from the plurality of images; and
   measuring three-dimensional positions of corresponding points based on parallax between the searched corresponding points.

5. A corresponding point searching method according to claim 1, wherein
   the step of searching comprises searching for the corresponding points in the plurality of images from a correlation obtained by synthesizing, with a predetermined weight, correlations taken between each of a plurality of corresponding pairs of the one-dimensional pixel data strings cut out from the plurality of images.

* * * * *